US012731889B2

(12) United States Patent
Cao et al.

(10) Patent No.: US 12,731,889 B2
(45) Date of Patent: Sep. 8, 2026

(54) ELECTROMAGNETIC-WAVE RADIATION SYSTEM, AND COMMUNICATION DEVICE

(71) Applicants: Beijing BOE Sensor Technology Co., Ltd., Beijing (CN); BOE Technology Group Co., Ltd., Beijing (CN); Beijing BOE Technology Development Co., Ltd., Beijing (CN)

(72) Inventors: Di Cao, Beijing (CN); Haocheng Jia, Beijing (CN); Xiaoqiang Yang, Beijing (CN); Yiming Wang, Beijing (CN); Liangrong Ge, Beijing (CN); Wei Zhao, Beijing (CN); Lu Chen, Beijing (CN); Mengjiao Li, Beijing (CN); Guodong Feng, Beijing (CN); Yan Lu, Beijing (CN); Yan Wang, Beijing (CN); Zhifeng Zhang, Beijing (CN)

(73) Assignees: Beijing BOE Sensor Technology Co., Ltd., Beijing (CN); BOE Technology Group Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 29 days.

(21) Appl. No.: 18/997,004

(22) PCT Filed: Apr. 17, 2024

(86) PCT No.: PCT/CN2024/088356
§ 371 (c)(1),
(2) Date: Jan. 18, 2025

(87) PCT Pub. No.: WO2024/244778
PCT Pub. Date: Dec. 5, 2024

(65) Prior Publication Data

US 2026/0031531 A1 Jan. 29, 2026

(30) Foreign Application Priority Data

May 30, 2023 (CN) ........................ 202310628961.6

(51) Int. Cl.
*H01Q 1/52* (2006.01)
*H01Q 1/42* (2006.01)
(Continued)

(52) U.S. Cl.
CPC ............ *H01Q 1/523* (2013.01); *H01Q 1/422* (2013.01); *H01Q 1/526* (2013.01); *H01Q 3/36* (2013.01); *H01Q 21/064* (2013.01)

(58) Field of Classification Search
CPC ........ H01Q 1/523; H01Q 1/422; H01Q 1/526; H01Q 3/36; H01Q 1/38; H01Q 1/52
See application file for complete search history.

(56) References Cited

U.S. PATENT DOCUMENTS

2021/0328355 A1* 10/2021 Xi ......................... H01Q 5/357
2023/0223705 A1* 7/2023 Johansson ........... H01Q 9/0435 343/702

FOREIGN PATENT DOCUMENTS

CN 114696058 A * 7/2022 ............ H01Q 1/242

* cited by examiner

*Primary Examiner* — Dieu Hien T Duong
(74) *Attorney, Agent, or Firm* — ArentFox Schiff LLP; Michael Fainberg

(57) ABSTRACT

An electromagnetic-wave radiation system includes: a first metal substrate; a second metal substrate, opposite to the first metal substrate; an electromagnetic wave transmission component, between the first metal substrate and the second metal substrate; where the electromagnetic wave transmission component includes a first glass substrate and a second glass substrate arranged opposite to each other, a liquid crystal layer between the first glass substrate and the second glass substrate, and a plurality of electromagnetic wave (Continued)

transmission structures on a side of that first glass substrate facing the liquid crystal layer; the first glass substrate is close to the first metal substrate; and an electromagnetic shielding structure, between the electromagnetic wave transmission component and the first metal substrate.

20 Claims, 15 Drawing Sheets

(51) Int. Cl.
*H01Q 3/36* (2006.01)
*H01Q 21/06* (2006.01)

ELECTROMAGNETIC-WAVE RADIATION SYSTEM, AND COMMUNICATION DEVICE

CROSS-REFERENCE TO RELATED APPLICATIONS

This application is a National Stage of International Application No. PCT/CN2024/088356, filed on Apr. 17, 2024, which claims priority to Chinese Patent Application No. 202310628961.6, filed on May 30, 2023, and entitled "Electromagnetic-Wave Radiation system, and Communication Device", the content of which is hereby incorporated by reference in its entirety.

TECHNICAL FIELD

The present disclosure relates to the technical field of microwave device, and in particular to an electromagnetic wave radiation system and a communication device.

BACKGROUND

Glass-based devices and circuits play an important role in modern wireless communication systems. The liquid crystal phase shifter and the glass-based antenna have good working characteristics and novel design schemes, and have become hot devices in scientific research in universities and engineering applications in enterprises in recent years.

However, electromagnetic crosstalk in glass-based devices and circuits can seriously affect the performance of the entire communication system.

SUMMARY

Embodiments of the present disclosure provide an electromagnetic wave radiation system and a communication device. Specific schemes are as follows.

Embodiments of the present disclosure provide an electromagnetic wave radiation system, including: a first metal substrate;

- a second metal substrate, opposite to the first metal substrate;
- an electromagnetic wave transmission component, between the first metal substrate and the second metal substrate; where the electromagnetic wave transmission component includes a first glass substrate and a second glass substrate arranged opposite to each other, a liquid crystal layer between the first glass substrate and the second glass substrate, and a plurality of electromagnetic wave transmission structures on a side of that first glass substrate facing the liquid crystal layer; the first glass substrate is close to the first metal substrate; and
- an electromagnetic shielding structure, between the electromagnetic wave transmission component and the first metal substrate, where the electromagnetic shielding structure includes a plurality of shielding units surrounded by a plurality of first metal pillars, the shielding units are arranged in one-to-one correspondence with the electromagnetic wave transmission structures, and an orthographic projection of the electromagnetic wave transmission structure on the first metal substrate is within a range of an orthographic projection of the shielding unit on the first metal substrate.

In a possible implementation, in the electromagnetic wave radiation system according to embodiments of the present disclosure, the electromagnetic shielding structure further includes:

- a first dielectric substrate, between the first metal substrate and the electromagnetic wave transmission component, where the first dielectric substrate includes a plurality of first cavities arranged in one-to-one correspondence with the electromagnetic wave transmission structures, and the plurality of first metal pillars are embedded at peripheries of the plurality of first cavities at intervals in the first dielectric substrate;
- a second dielectric substrate, between the first dielectric substrate and the electromagnetic wave transmission component;
- a plurality of second metal pillars embedded in the second dielectric substrate at intervals and in contact with the first metal pillars in one-to-one correspondence.

In a possible implementation, in the electromagnetic wave radiation system according to embodiments of the present disclosure, the electromagnetic wave radiation system further includes:

- a plurality of waveguide structures, on a side of the first metal substrate facing the second metal substrate, where the plurality of waveguide structures are arranged in one-to-one correspondence with the first cavities, an orthographic projection of the first cavity on the first metal substrate coincides with an orthographic projection of the waveguide structure on the first metal substrates, and the first dielectric substrate is embedded at peripheries of the plurality of waveguide structures through the first cavities;
- first ridge-shaped holes, penetrating through the waveguide structures and the first metal substrate below the waveguide structures;
- a plurality of first metal layers, on a side of the second dielectric substrate facing the second metal substrate, and arranged in one-to-one correspondence with the waveguide structures, where the first metal layers have second ridge-shaped holes corresponding to the first ridge-shaped holes in one-to-one correspondence.

In a possible implementation, in the electromagnetic wave radiation system according to embodiments of the present disclosure, the electromagnetic wave radiation system further includes:

- a plurality of waveguide structures, on a side of the first metal substrate facing the second metal substrate, where the waveguide structures and the electromagnetic wave transmission structures are arranged in one-to-one correspondence, and the first metal pillars are arranged at peripheries of the plurality of waveguide structures.

In a possible implementation, in the electromagnetic wave radiation system according to embodiments of the present disclosure, the electromagnetic wave radiation system further includes:

- first ridge-shaped holes, penetrating through the waveguide structures and the first metal substrate below the waveguide structures;
- a second dielectric substrate, between the waveguide structures and the electromagnetic wave transmission component;
- a plurality of first metal layers, on a side of the second dielectric substrate facing the second metal substrate, and arranged in one-to-one correspondence with the waveguide structures, where the first metal layers have second ridge-shaped holes corresponding to the first ridge-shaped holes in one-to-one correspondence.

In a possible implementation, in the electromagnetic wave radiation system according to embodiments of the present disclosure, a size of the first metal layer is the same as a size of the waveguide structure.

In a possible implementation, in the electromagnetic wave radiation system according to embodiments of the present disclosure, an orthographic projection of the first ridge-shaped hole on the first metal substrate and an orthographic projection of the second ridge-shaped hole on the first metal substrate overlap with each other.

In a possible implementation, in the electromagnetic wave radiation system according to embodiments of the present disclosure, the electromagnetic wave transmission structures are patch antennas; the second metal substrate includes a plurality of hollow structures arranged in one-to-one correspondence with the patch antennas.

In a possible implementation, in the electromagnetic wave radiation system according to embodiments of the present disclosure, the electromagnetic shielding structure further includes:

- a third dielectric substrate, between the first metal substrate and the electromagnetic wave transmission component, where the third dielectric substrate includes a plurality of second cavities arranged in one-to-one correspondence with the electromagnetic wave transmission structures, and the plurality of first metal pillars are embedded at peripheries of the plurality of second cavities at intervals in the third dielectric substrate.

In a possible implementation, in the electromagnetic wave radiation system according to embodiments of the present disclosure, the electromagnetic shielding structure further includes:

- a plurality of metal sheets, arranged at intervals on a side of the third dielectric substrate facing the electromagnetic wave transmission component, and in contact with the first metal pillars in one-to-one correspondence.

In a possible implementation, in the electromagnetic wave radiation system according to embodiments of the present disclosure, the electromagnetic wave radiation system further includes:

- a fourth dielectric substrate, on a side of the second metal substrate away from the first metal substrate;
- a plurality of radiation patches, on a side of the fourth dielectric substrate away from the first metal substrate;
- a plurality of opening structures, on the second metal substrate, where the opening structures are arranged in one-to-one correspondence with the electromagnetic wave transmission structures.

In a possible implementation, in the electromagnetic wave radiation system according to embodiments of the present disclosure, a shape of the radiation patch includes a quadrangle or a hexagon.

In a possible implementation, in the electromagnetic wave radiation system according to embodiments of the present disclosure, a shape of the opening structure is an arc.

In a possible implementation, in the electromagnetic wave radiation system according to embodiments of the present disclosure, the electromagnetic wave transmission structure includes two strip lines extending in intersected directions.

In a possible implementation, in the electromagnetic wave radiation system according to embodiments of the present disclosure, a quantity of the opening structures corresponding to each of the electromagnetic wave transmission structures and a quantity of the strip lines included in each of the electromagnetic wave transmission structures are the same.

In a possible implementation, in the electromagnetic wave radiation system according to embodiments of the present disclosure, the electromagnetic wave transmission structure includes a strip line.

In a possible implementation, in the electromagnetic wave radiation system according to embodiments of the present disclosure, the strip line includes a first portion and a second portion connected in the same direction, and a width of the first portion and a width of the second portion are different.

In a possible implementation, in the electromagnetic wave radiation system according to embodiments of the present disclosure, an orthographic projection of a junction of the first portion and the second portion on the first metal substrate partially overlaps with an orthographic projection of the ridge-shaped hole on the first metal substrate.

In a possible implementation, in the electromagnetic wave radiation system according to embodiments of the present disclosure, at least two rings of the first metal pillars are arranged at a periphery of each of the plurality of shielding units.

Correspondingly, embodiments of the present disclosure further provide a communication device, including the electromagnetic wave radiation system according to embodiments of the present disclosure.

DETAILED DESCRIPTION

Figure 1:
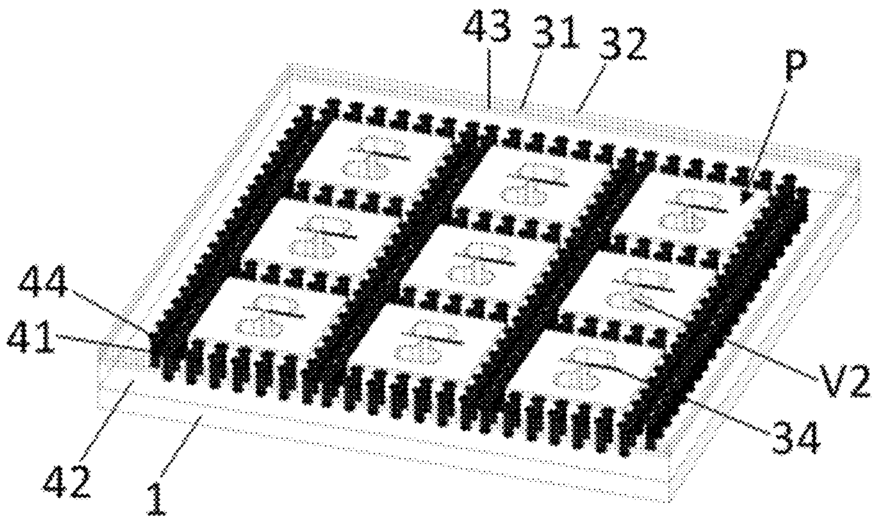
FIG. 1 is a three-dimensional structural diagram of an electromagnetic wave radiation system according to an embodiment of the present disclosure.

For making objectives, technical solutions and advantages of embodiments of the present disclosure clearer, technical solutions of embodiments of the present disclosure will be clearly and completely described below in conjunction with accompanying drawings in embodiments of the present disclosure. Apparently, embodiments described are some rather than all of embodiments of the present disclosure. Embodiments in the present disclosure and features of embodiments may be combined with each other without conflict. Based on embodiments of the present disclosure, all other embodiments obtained by those of ordinary skill in the art without making creative efforts fall within the scope of protection of the present disclosure.

Unless otherwise defined, technical or scientific terms used in the present disclosure should have ordinary meanings as understood by those of ordinary skill in the art to which the present disclosure belongs. The word "including" or "comprising", etc. indicates that elements or objects before the word include elements or objects after the word and their equivalents, without excluding other elements or objects. The word "connection" or "link", etc. is not limited to physical or mechanical connections, but may include electrical connections, whether direct or indirect. "Inner", "outer", "upper", "lower", etc. are only used to indicate a relative positional relationship, and when an absolute position of a described object changes, the relative positional relationship may also change accordingly.

It should be noted that a size and a shape of each figure in the drawings do not reflect a true scale, but only for illustrating the present disclosure. Throughout the drawings, identical or similar reference numerals denote identical or similar elements or elements having identical or similar functions.

Glass-based devices and circuits play an important role in modern wireless communication systems. The liquid crystal phase shifter and the glass-based antenna have good working characteristics and novel design schemes, and have become hot devices in scientific research in universities and engineering applications in enterprises in recent years. However, electromagnetic crosstalk in glass-based devices and circuits can seriously affect the performance of the entire communication system.

At present, the most common and effective method to solve the electromagnetic crosstalk between the glass-based device and the circuit is to make through holes in the glass substrate. However, due to the special properties of the glass material, it is difficult to drill holes on the glass substrate.

Figure 2:
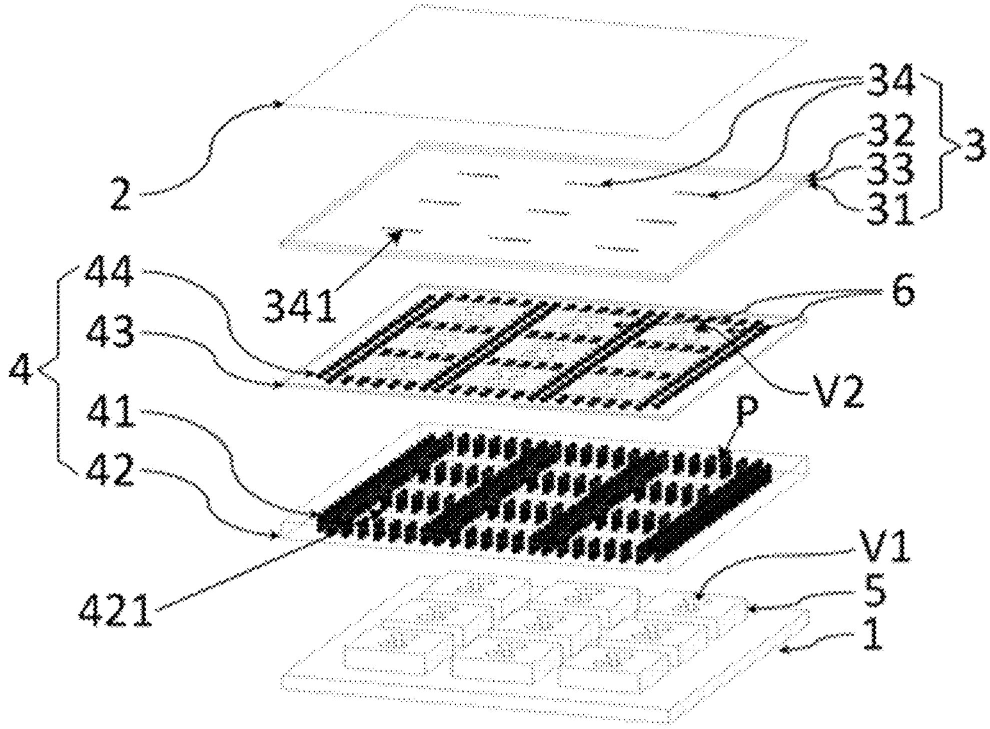
FIG. 2 is a schematic explosion diagram corresponding to FIG. 1.
Figure 6:
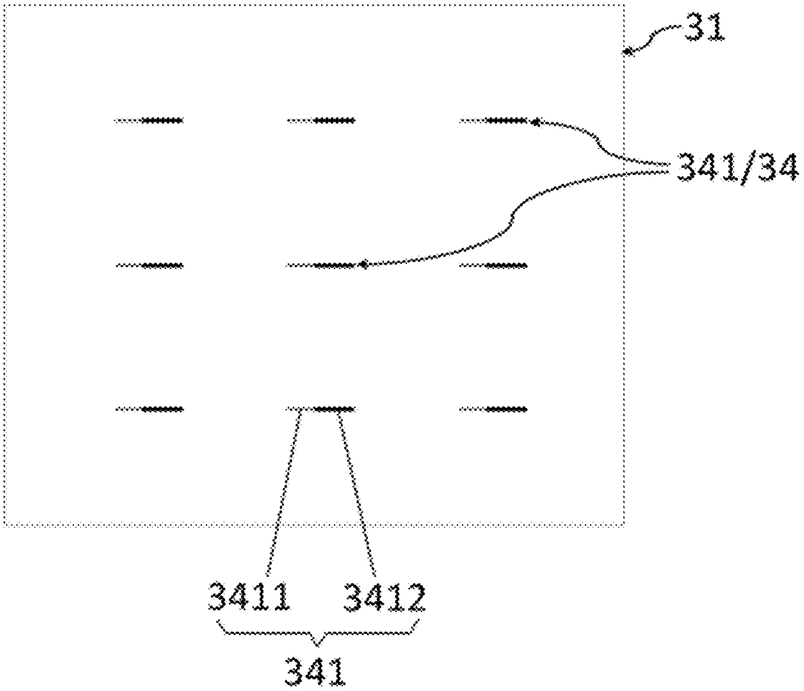
FIG. 6 is a schematic plan view of a first glass substrate and an electromagnetic wave transmission structure in FIG. 1.

In a possible implementation, in order to solve the above problem that it is difficult to drill holes on the glass substrate to solve the electromagnetic crosstalk between the glass-based device and the circuit, embodiments of the present disclosure provide an electromagnetic wave radiation system. As shown in FIGS. 1 and 2, FIG. 1 is a three-dimensional structural diagram of an electromagnetic wave radiation system according to an embodiment of the present disclosure, and FIG. 2 is a schematic explosion diagram corresponding to FIG. 1. The electromagnetic wave radiation system includes: a first metal substrate 1; a second metal substrate 2, opposite to the first metal substrate 1; an electromagnetic wave transmission component 3, between the first metal substrate 1 and the second metal substrate 2; where the electromagnetic wave transmission component 3 includes a first glass substrate 31 and a second glass substrate 32 arranged opposite to each other, a liquid crystal layer 33 between the first glass substrate 31 and the second glass substrate 32, and a plurality of electromagnetic wave transmission structures 34 on a side of the first glass substrate 31 facing the liquid crystal layer 33; where the first glass substrate 31 is close to the first metal substrate 1; as shown in FIG. 6, FIG. 6 is a schematic plan view of a first glass substrate 31 and an electromagnetic wave transmission structure 34; and an electromagnetic shielding structure 4, between the electromagnetic wave transmission component 3 and the first metal substrate 1, where the electromagnetic shielding structure 4 includes a plurality of shielding units P surrounded by a plurality of first metal pillars 41, the shielding units P are arranged in one-to-one correspondence with the electromagnetic wave transmission structures 34, and an orthographic projection of the electromagnetic wave transmission structure 34 on the first metal substrate 1 is within a range of an orthographic projection of the shielding unit P on the first metal substrate 1.

In the electromagnetic wave radiation system according to an embodiment of the present disclosure, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

In a specific implementation, in the above electromagnetic wave radiation system according to an embodiment of the present disclosure, as shown in FIG. 1 and FIG. 2, the electromagnetic shielding structure 4 further includes following components.

Figure 4:
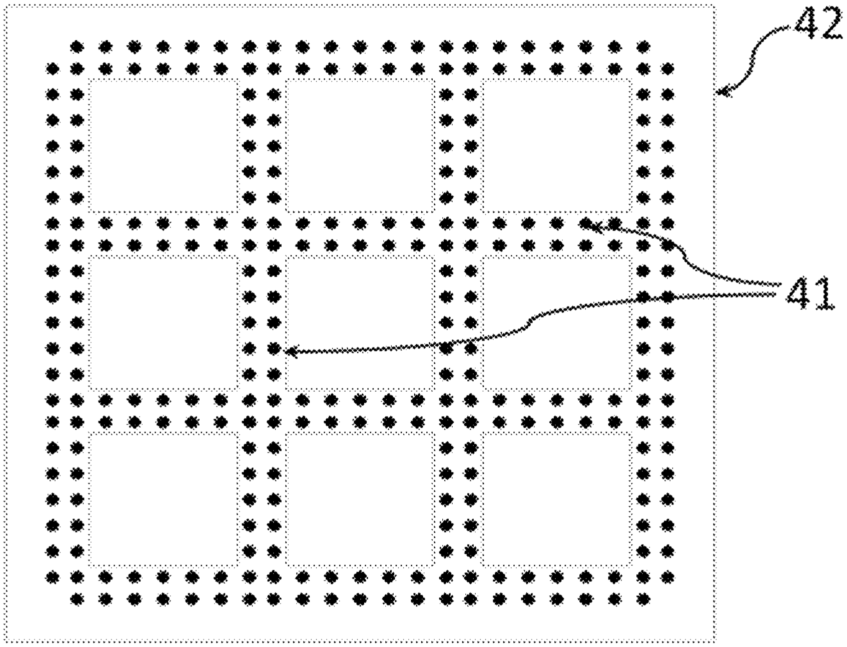
FIG. 4 is a schematic plan view of first metal pillars and a first dielectric substrate in FIG. 1.

A first dielectric substrate 42 is disposed between the first metal substrate 1 and the electromagnetic wave transmission component 3. The first dielectric substrate 42 includes a plurality of first cavities 421 arranged in one-to-one correspondence with the electromagnetic wave transmission structures 34. The plurality of first metal pillars 41 are embedded at peripheries of the first cavities 421 at intervals in the first dielectric substrate 42. FIG. 4 is a schematic plan view of first metal pillars 41 and a first dielectric substrate 42. A shape of the first cavity 421 is of course not limited to a rectangle.

A second dielectric substrate 43 is disposed between the first dielectric substrate 42 and the electromagnetic wave transmission component 3.

A plurality of second metal pillars 44 are embedded in the second dielectric substrate 43 at intervals and in contact with the first metal pillars 41 in a one-to-one correspondence, so that arrangement of the second metal pillars 44 in the same as arrangement of the first metal pillar 41. The second metal pillar 44 and the first metal pillar 41 form a metal pillar.

The electromagnetic wave radiation system further includes following components.

A plurality of waveguide structures 5 are disposed on a side of the first metal substrate 1 facing the second metal substrate 2. The plurality of waveguide structures 5 are arranged in one-to-one correspondence with the first cavities 421. An orthographic projection of the first cavity 421 on the first metal substrate 1 coincides with an orthographic projection of the waveguide structure 5 on the first metal substrate 1. The first dielectric substrate 42 is embedded at peripheries of the plurality of waveguide structures 5 through the first cavities 421. A thickness of the first dielectric substrate 42 is the same as a height of the waveguide structure 5, and a size of the first cavity 421 is the same as a size of the waveguide structure 5, so that the first dielectric substrate 42 is just clamped at the periphery of each waveguide structure 5.

Figure 3:
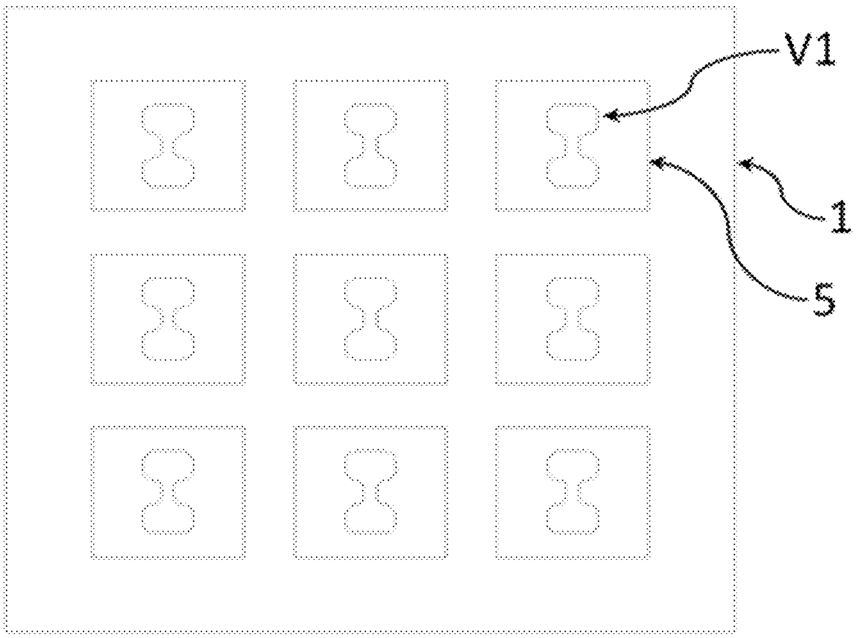
FIG. 3 is a schematic plan view of a first metal substrate, a waveguide structure, and a first ridge-shaped hole in FIG. 1.

First ridge-shaped holes V1 penetrate through the waveguide structures 5 and the first metal substrate 1 below the waveguide structures 5. As shown in FIG. 3, FIG. 3 is a schematic plan view of the first metal substrate 1, the waveguide structures 5, and the first ridge-shaped holes V1. The first ridge-shaped hole V1 is a transmission channel of electromagnetic wave energy. The first metal substrate 1, the waveguide structure 5 and the first ridge-shaped hole V1 form a waveguide port feed network.

Figure 5:
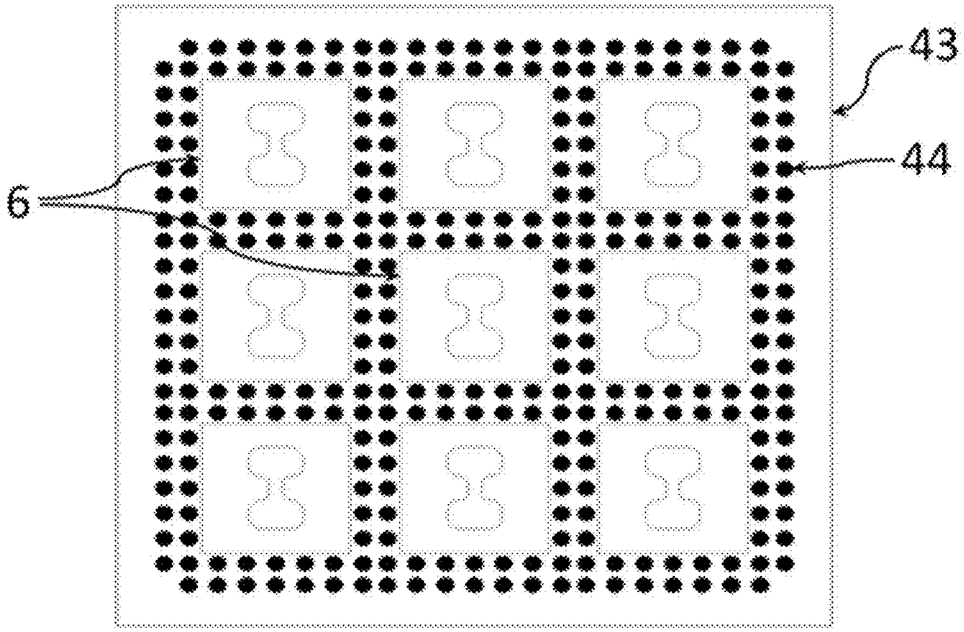
FIG. 5 is a schematic plan view of a second dielectric substrate, a second metal pillar, and a first metal layer in FIG. 1.

A plurality of first metal layers 6 are disposed on a side of the second dielectric substrate 43 facing the second metal substrate 2. A size of the first metal layer 6 is the same as a size of the waveguide structure 5. The first metal layers 6 have second ridge-shaped holes V2 arranged in one-to-one correspondence with the first ridge-shaped holes V1. As shown in FIG. 5, FIG. 5 is a schematic plan view of the second dielectric substrate 43, the second metal pillars 44, and the first metal layer 6.

In a specific implementation, in the above electromagnetic wave radiation system according to an embodiment of the present disclosure, as shown in FIG. 1 and FIG. 2, an orthographic projection of the first ridge-shaped hole V1 on the first metal substrate 1 and an orthographic projection of the second ridge-shaped hole V2 on the first metal substrate 1 overlap with each other. In this way, the electromagnetic wave transmitted from the first ridge-shaped hole V1 is completely transmitted to the second ridge-shaped hole V2, and the transmission amount of the electromagnetic wave is increased.

In a specific implementation, in the above electromagnetic wave radiation system according to an embodiment of the present disclosure, as shown in FIG. 1 and FIG. 2, the orthographic projection of the first ridge-shaped hole V1 on the first metal substrate 1 and the orthographic projection of the second ridge-shaped hole V2 on the first metal substrate 1 may completely overlap with each other, and the orthographic projection of the first ridge-shaped hole V1 and the orthographic projection of the second ridge-shaped hole V2 on the first metal substrate 1 are located within an orthographic projection of the shielding unit P on the first metal substrate 1. In this way, an orthographic projection of a junction of a first portion 3411 and a second portion 3412 on the first metal substrate 1 can be arranged within the orthographic projection of the first ridge-shaped hole V1 and the orthographic projection of the second ridge-shaped hole V2 on the first metal substrate 1. Optionally, the orthographic projection of the junction of the first portion 3411 and the second portion 3412 on the first metal substrate 1 is arranged to partially overlap with the orthographic projection of the first ridge-shaped hole V1 on the metal substrate 1. Optionally, the orthographic projection of the junction of the first portion 3411 and the second portion 3412 on the first metal substrate 1 is arranged to overlap with an orthographic projection of a central position of the first ridge-shaped hole V1 and an orthographic projection of a central position of the second ridge hole V2 on the first metal substrate 1. That is, the orthographic projection of the junction of the first portion 3411 and the second portion 3412 on the first metal substrate 1 is arranged to be located at a central position of the shielding unit P.

In a specific implementation, in the above electromagnetic wave radiation system according to an embodiment of the present disclosure, as shown in FIGS. 1 and 2, the electromagnetic wave transmission structure 34 may include a strip line 341. As shown in FIG. 6, the strip line 341 includes a first portion 3411 and a second portion 3412 connected in the same direction. A width of the first portion 3411 and a width of the second portion 3412 are different. For example, the width of the first portion 3411 is less than the width of the second portion 3412. Of course, the width of the first portion 3411 may be greater than width of the second portion 3412. Those skilled in the art can adjust the width of the first portion 3411 and the width of the second portion 3412 according to actual requirements.

The first metal substrate 1, the waveguide structure 5, and the first ridge-shaped hole V1 in FIG. 1 and FIG. 2 form a waveguide port feed network. Electromagnetic wave energy is fed from the first ridge-shaped holes V1. The first metal substrate 1, the first dielectric substrate 42, the first metal pillars 41, the second dielectric substrate 43, the second metal pillars 44, and the second metal substrate 2 together form a substrate-integrated gap waveguide. The second metal substrate 2 is used as a perfect electrical conductor (PEC). The metal pillar composed of the first metal pillar 41 and the second metal pillar 44 is used as a magnetic conductor (AMC), and an air gap layer is formed between an upper layer and a lower layer. After the electromagnetic wave energy is output from the waveguide port (V1), the electromagnetic wave energy is coupled up to the electromagnetic wave transmission structure 34 through the second ridge-shaped hole V2 and the air gap layer. The electromagnetic wave transmission structure 34 (strip line) in FIG. 2 is equivalent to a probe, and the electromagnetic wave energy can be obtained from the probe. The gap waveguide in FIG. 2 allows electromagnetic waves to be propagated only inside the shielding unit P due to upper and lower closed metal substrates of the gap waveguide. When being fed from the waveguide port (V1) of one of the shielding units P, the energy is transmitted through the gap waveguide to the electromagnetic wave transmission structure 34 above the gap waveguide. Therefore, the problem of electromagnetic wave crosstalk between adjacent electromagnetic wave transmission structures 34 can be effectively avoided.

It should be noted that FIG. 2 of an embodiment of the present disclosure takes waveguide feed networks of a 3×3 array as an example, which is certainly not limited thereto. Fewer than 9 waveguide feed networks are possible, and more waveguide feed networks may also be arranged.

Figure 11:
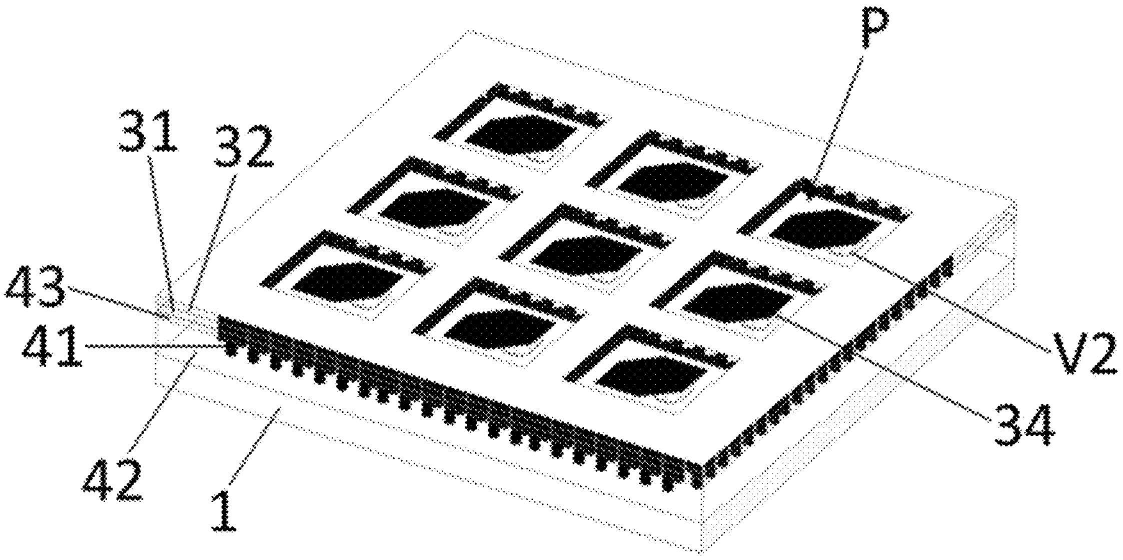
FIG. 11 is a three-dimensional structural diagram of another electromagnetic wave radiation system according to an embodiment of the present disclosure.
Figure 12:
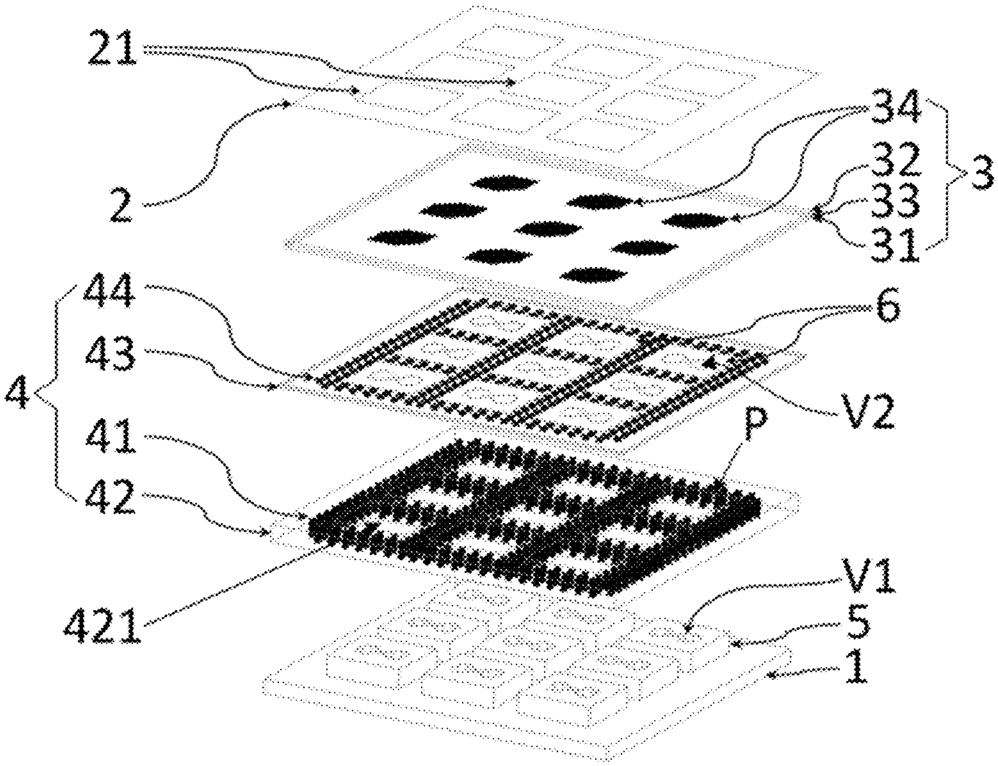
FIG. 12 is a schematic explosion diagram corresponding to FIG. 11.

In a possible implementation, in order to solve the above problem that it is difficult to drill a hole on a glass substrate to solve the electromagnetic crosstalk between the glass-based device and the circuit, an embodiment of the present disclosure provide another electromagnetic wave radiation system, as shown in FIGS. 11 and 12. FIG. 11 is a three-dimensional structural diagram of another electromagnetic wave radiation system according to an embodiment of the present disclosure. FIG. 12 is a schematic explosion diagram corresponding to FIG. 11. The electromagnetic wave radiation system includes: a first metal substrate 1; a second metal substrate 2, opposite to the first metal substrate 1; an electromagnetic wave transmission component 3, between the first metal substrate 1 and the second metal substrate 2; where the electromagnetic wave transmission component 3 includes a first glass substrate 31 and a second glass substrate 32 arranged opposite to each other, a liquid crystal layer 33 between the first glass substrate 31 and the second glass substrate 32, and a plurality of electromagnetic wave transmission structures 34 on a side of the first glass substrate 31 facing the liquid crystal layer 33; where the first glass substrate 31 is close to the first metal substrate 1; and an electromagnetic shielding structure 4, between the electromagnetic wave transmission component 3 and the first metal substrate 1, where the electromagnetic shielding structure 4 includes a plurality of shielding units P surrounded by a plurality of first metal pillars 41, the shielding units P are arranged in one-to-one correspondence with the electromagnetic wave transmission structures 34, and an orthographic projection of the electromagnetic wave transmission structure 34 on the first metal substrate 1 is within a range of an orthographic projection of the shielding unit P on the first metal substrate 1.

In the electromagnetic wave radiation system according to an embodiment of the present disclosure, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

In a specific implementation, in the above electromagnetic wave radiation system according to an embodiment of the present disclosure, as shown in FIG. 11 and FIG. 12, the electromagnetic shielding structure 4 further includes following components.

A first dielectric substrate 42 is disposed between the first metal substrate 1 and the electromagnetic wave transmission component 3. The first dielectric substrate 42 includes a plurality of first cavities 421 arranged in one-to-one correspondence with the electromagnetic wave transmission structures 34. The plurality of first metal pillars 41 are embedded at peripheries of the first cavities 421 at intervals in the first dielectric substrate 42. A shape of the first cavity 421 is of course not limited to a rectangle.

A second dielectric substrate 43 is disposed between the first dielectric substrate 42 and the electromagnetic wave transmission component 3.

A plurality of second metal pillars 44 are embedded in the second dielectric substrate 43 at intervals and in contact with the first metal pillars 41 in a one-to-one correspondence, so that arrangement of the second metal pillars 44 in the same as arrangement of the first metal pillar 41. The second metal pillar 44 and the first metal pillar 41 form a metal pillar.

The electromagnetic wave radiation system further includes following components.

A plurality of waveguide structures 5 are disposed on a side of the first metal substrate 1 facing the second metal substrate 2. The plurality of waveguide structures 5 are arranged in one-to-one correspondence with the first cavities 421. An orthographic projection of the first cavity 421 on the first metal substrate 1 coincides with an orthographic projection of the waveguide structure 5 on the first metal substrate 1. The first dielectric substrate 42 is embedded at peripheries of the plurality of waveguide structures 5 through the first cavity 421. A thickness of the first dielectric substrate 42 is the same as a height of the waveguide structure 5, and a size of the first cavity 421 is the same as a size of the waveguide structure 5, so that the first dielectric substrate 42 is just clamped at the periphery of each waveguide structure 5.

First ridge-shaped hole V1 penetrate through the waveguide structures 5 and the first metal substrate 1 below the waveguide structures 5. The first ridge-shaped hole V1 is a transmission channel of electromagnetic wave energy. The first metal substrate 1, the waveguide structure 5 and the first ridge-shaped hole V1 form a waveguide port feed network.

A plurality of first metal layers 6 are disposed on a side of the second dielectric substrate 43 facing the second metal substrate 2. A size of the first metal layer 6 is the same as a size of the waveguide structure 5. The first metal layers 6 have second ridge-shaped holes V2 arranged in one-to-one correspondence with the first ridge-shaped holes V1.

In a specific implementation, in the above electromagnetic wave radiation system according to an embodiment of the present disclosure, as shown in FIG. 11 and FIG. 12, an orthographic projection of the first ridge-shaped hole V1 on the first metal substrate 1 and an orthographic projection of the second ridge-shaped hole V2 on the first metal substrate 1 overlap with each other. In this way, the electromagnetic wave transmitted from the first ridge-shaped hole V1 is completely transmitted to the second ridge-shaped hole V2, and the transmission amount of the electromagnetic wave is increased.

In a specific implementation, in the above electromagnetic wave radiation system according to an embodiment of the present disclosure, as shown in FIG. 11 and FIG. 12, the orthographic projection of the first ridge-shaped hole V1 on the first metal substrate 1 and the orthographic projection of the second ridge-shaped hole V2 on the first metal substrate 1 may completely overlap with each other, and the orthographic projection of the first ridge-shaped hole V1 and the orthographic projection of the second ridge-shaped hole V2 on the first metal substrate 1 are located within an orthographic projection of the shielding unit P on the first metal substrate 1. In this way, an orthographic projection of a junction of a first portion 3411 and a second portion 3412 on the first metal substrate 1 can be arranged within the orthographic projection of the first ridge-shaped hole V1 and the orthographic projection of the second ridge-shaped hole V2 on the first metal substrate 1. Optionally, the orthographic projection of the junction of the first portion 3411 and the second portion 3412 on the first metal substrate 1 is arranged to partially overlap with the orthographic projection of the first ridge-shaped hole V1 on the metal substrate 1. Optionally, the orthographic projection of the junction of the first portion 3411 and the second portion 3412 on the first metal substrate 1 is arranged to overlap with an orthographic projection of a central position of the first ridge-shaped hole V1 and an orthographic projection of a central position of the second ridge-shaped hole V2 on the first metal substrate 1. That is, the orthographic projection of the junction of the first portion 3411 and the second portion 3412 on the first metal substrate 1 is arranged to be located at a central position of the shielding unit P.

In a specific implementation, in the above electromagnetic wave radiation system according to an embodiment of the present disclosure, as shown in FIGS. 11 and 12, the electromagnetic wave transmission structure 34 may be a patch antenna. The second metal substrate 2 includes a plurality of hollow structures 21 corresponding to the waveguide structures 5.

The first metal substrate 1, the waveguide structure 5, and the first ridge-shaped hole V1 in FIG. 11 and FIG. 12 form a waveguide port feed network. Electromagnetic wave energy is fed from the first ridge-shaped holes V1. The first metal substrate 1, the first dielectric substrate 42, the first metal pillars 41, the second dielectric substrate 43, the second metal pillars 44, and the second metal substrate 2 together form a substrate-integrated gap waveguide. The second metal substrate 2 is used as a perfect electrical conductor (PEC). The metal pillar composed of the first metal pillar 41 and the second metal pillar 44 is used as a magnetic conductor (AMC), and an air gap layer is formed between an upper layer and a lower layer. After the electromagnetic wave energy is output from the waveguide port (V1), the electromagnetic wave energy is coupled up to the electromagnetic wave transmission structure 34 through the second ridge-shaped hole V2 and the air gap layer. The hollow structure 21 may enable the electromagnetic wave transmission structure 34 (patch antenna) to radiate energy into free space. The gap waveguide in FIG. 12 allows electromagnetic waves to be propagated only inside the shielding unit P due to upper and lower closed metal substrates of the gap waveguide. When being fed from the waveguide port (V1) of one of the shielding units P, the energy is transmitted through the gap waveguide to the electromagnetic wave transmission structure 34 above the gap waveguide. Therefore, the problem of electromagnetic wave crosstalk between adjacent electromagnetic wave transmission structures 34 can be effectively avoided.

It should be noted that FIG. 12 of an embodiment of the present disclosure takes waveguide feed networks of a 3×3 array as an example, which is certainly not limited thereto. Fewer than 9 waveguide feed networks are possible, and more waveguide feed networks may also be arranged.

Figure 13:
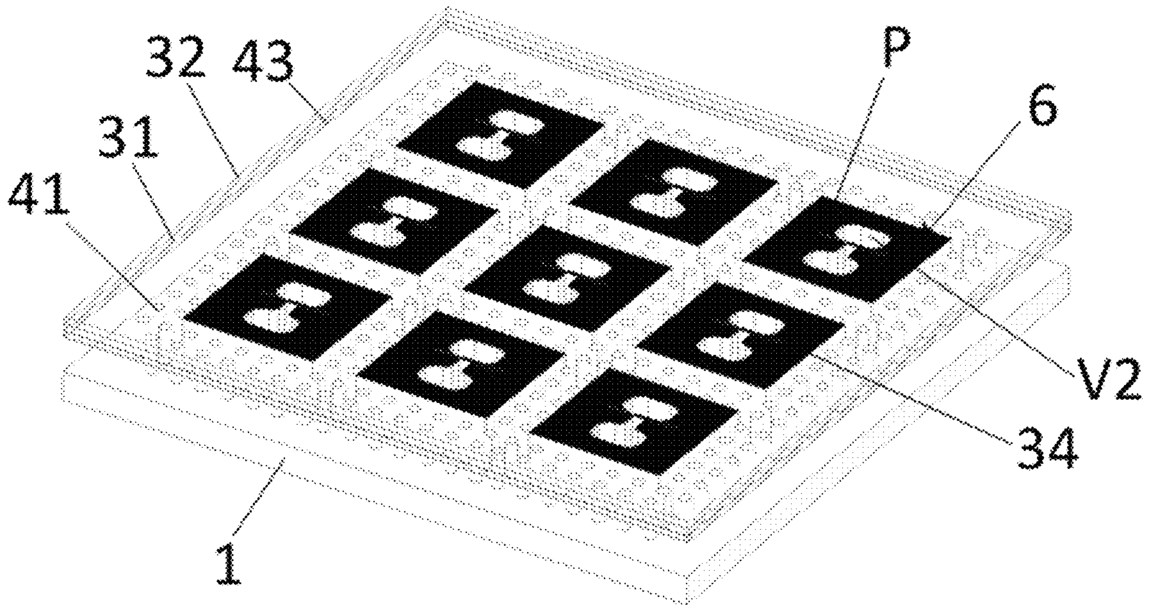
FIG. 13 is a three-dimensional structural diagram of another electromagnetic wave radiation system according to an embodiment of the present disclosure.
Figure 14:
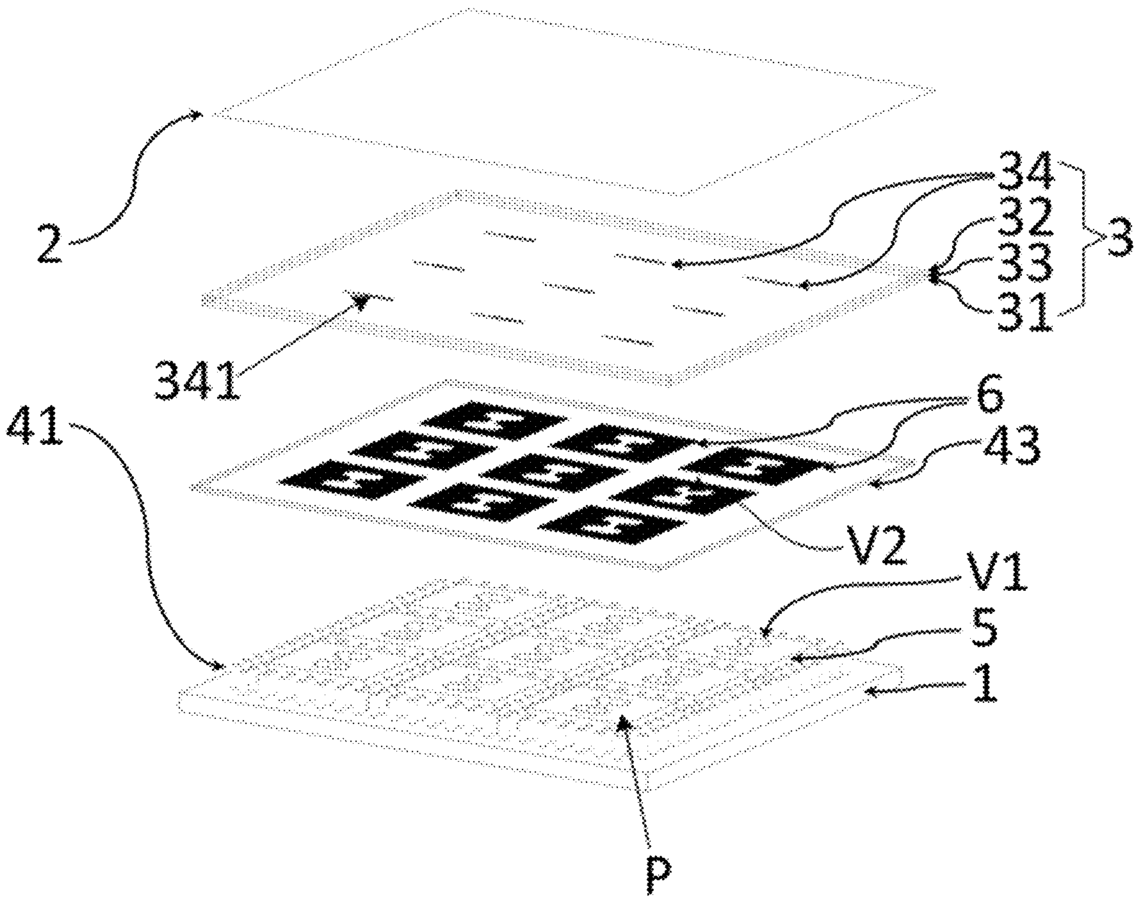
FIG. 14 is a schematic explosion diagram corresponding to FIG. 13.

In a possible implementation, in order to solve the above problem that it is difficult to drill a hole on a glass substrate to solve the electromagnetic crosstalk between the glass-based device and the circuit, an embodiment of the present disclosure provides another electromagnetic wave radiation system, as shown in FIGS. 13 and 14. FIG. 13 is a three-dimensional structural diagram of another electromagnetic wave radiation system according to an embodiment of the present disclosure. FIG. 14 is a schematic explosion diagram corresponding to FIG. 13. The electromagnetic wave radiation system includes: a first metal substrate 1; a second metal substrate 2, opposite to the first metal substrate 1; an electromagnetic wave transmission component 3, between the first metal substrate 1 and the second metal substrate 2; where the electromagnetic wave transmission component 3 includes a first glass substrate 31 and a second glass substrate 32 arranged opposite to each other, a liquid crystal layer 33 between the first glass substrate 31 and the second glass substrate 32, and a plurality of electromagnetic wave transmission structures 34 on a side of the first glass substrate 31 facing the liquid crystal layer 33; where the first glass substrate 31 is close to the first metal substrate 1; and an electromagnetic shielding structure 4, between the electromagnetic wave transmission component 3 and the first metal substrate 1, where the electromagnetic shielding structure 4 includes a plurality of shielding units P surrounded by a plurality of first metal pillars 41, the shielding units P are arranged in one-to-one correspondence with the electromagnetic wave transmission structures 34, and an orthographic projection of the electromagnetic wave transmission structure 34 on the first metal substrate 1 is within a range of an orthographic projection of the shielding unit P on the first metal substrate 1.

In the electromagnetic wave radiation system according to an embodiment of the present disclosure, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

In a specific implementation, in the above electromagnetic wave radiation system according to an embodiment of the present disclosure, as shown in FIG. 13 and FIG. 14, the electromagnetic wave radiation system further includes following components.

A plurality of waveguide structures 5 are disposed on a side of the first metal substrate 1 facing the second metal substrate 2. The plurality of waveguide structures 5 are arranged in one-to-one correspondence with the electromagnetic wave transmission structures 34, and the first metal pillars 41 are arranged at peripheries of the plurality of waveguide structures 5.

First ridge-shaped holes V1 penetrate through the waveguide structures 5 and the first metal substrate 1 below the waveguide structures 5. The first ridge-shaped hole V1 is a transmission channel of electromagnetic wave energy. The first metal substrate 1, the waveguide structure 5 and the first ridge-shaped hole V1 form a waveguide port feed network.

A second dielectric substrate 43 is disposed between the waveguide structures 5 and the electromagnetic wave transmission component 3.

A plurality of first metal layers 6 are disposed on a side of the second dielectric substrate 43 facing the second metal substrate 2. A size of the first metal layer 6 is the same as a size of the waveguide structure 5. The first metal layers 6 have second ridge-shaped holes V2 corresponding to the first ridge-shaped holes V1.

In a specific implementation, in the above electromagnetic wave radiation system according to an embodiment of the present disclosure, as shown in FIG. 13 and FIG. 14, an orthographic projection of the first ridge-shaped hole V1 on the first metal substrate 1 and an orthographic projection of the second ridge-shaped hole V2 on the first metal substrate 1 overlap with each other. In this way, the electromagnetic wave transmitted from the first ridge-shaped hole V1 is completely transmitted to the second ridge-shaped hole V2, and the transmission amount of the electromagnetic wave is increased.

In a specific implementation, in the above electromagnetic wave radiation system according to an embodiment of the present disclosure, as shown in FIG. 13 and FIG. 14, the orthographic projection of the first ridge-shaped hole V1 on the first metal substrate 1 and the orthographic projection of the second ridge-shaped hole V2 on the first metal substrate 1 may completely overlap with each other, and the orthographic projection of the first ridge-shaped hole V1 and the orthographic projection of the second ridge-shaped hole V2 on the first metal substrate 1 are located within an orthographic projection of the shielding unit P on the first metal substrate 1. In this way, an orthographic projection of a junction of a first portion 3411 and a second portion 3412 on the first metal substrate 1 can be arranged within the orthographic projection of the first ridge-shaped hole V1 and the orthographic projection of the second ridge-shaped hole V2 on the first metal substrate 1. Optionally, the orthographic projection of the junction of the first portion 3411 and the second portion 3412 on the first metal substrate 1 is arranged to partially overlap with the orthographic projection of the first ridge-shaped hole V1 on the metal substrate 1. Optionally, the orthographic projection of the junction of the first portion 3411 and the second portion 3412 on the first metal substrate 1 is arranged to overlap with an orthographic projection of a central position of the first ridge-shaped hole V1 and an orthographic projection of a central position of the second ridge-shaped hole V2 on the first metal substrate 1. That is, the orthographic projection of the junction of the first portion 3411 and the second portion 3412 on the first metal substrate 1 is arranged to be located at a central position of the shielding unit P.

In a specific implementation, in the above electromagnetic wave radiation system according to an embodiment of the present disclosure, as shown in FIGS. 13 and 14, the electromagnetic wave transmission structure 34 may include a strip line 341. Referring to the strip line 341 structure shown in FIG. 6, the strip line 341 includes a first portion 3411 and a second portion 3412 connected in the same direction. A width of the first portion 3411 and a width of the second portion 3412 are different. For example, the width of the first portion 3411 is less than the width of the second portion 3412. Of course, the width of the first portion 3411 may be greater than width of the second portion 3412. Those skilled in the art can adjust the width of the first portion 3411 and the width of the second portion 3412 according to actual requirements.

The first metal substrate 1, the waveguide structure 5, and the first ridge-shaped hole V1 in FIG. 13 and FIG. 14 form a waveguide port feed network. Electromagnetic wave energy is fed from the first ridge-shaped holes V1. The first metal pillars 41 and the second metal substrate 2 together form a metal-integrated gap waveguide. The second metal substrate 2 is used as a perfect electrical conductor (PEC). The first metal pillar 41 is used as a magnetic conductor (AMC), and an air gap layer is formed between an upper layer and a lower layer. After the electromagnetic wave energy is output from the waveguide port (V1), the electromagnetic wave energy is coupled up to the electromagnetic wave transmission structure 34 through the second ridge-shaped hole V2 and the air gap layer. The electromagnetic wave transmission structure 34 (strip line) in FIG. 14 is equivalent to a probe, and the electromagnetic wave energy can be obtained from the probe. The gap waveguide in FIG. 14 allows electromagnetic waves to be propagated only inside the shielding unit P due to upper and lower closed metal substrates of the gap waveguide. When being fed from the waveguide port (V1) of one of the shielding units P, the energy is transmitted through the gap waveguide to the electromagnetic wave transmission structure 34 above the gap waveguide. Therefore, the problem of electromagnetic wave crosstalk between adjacent electromagnetic wave transmission structures 34 can be effectively avoided.

It should be noted that FIG. 14 of an embodiment of the present disclosure takes waveguide feed networks of a 3×3 array as an example, which is certainly not limited thereto. Fewer than 9 waveguide feed networks are possible, and more waveguide feed networks may also be arranged.

Figure 15:
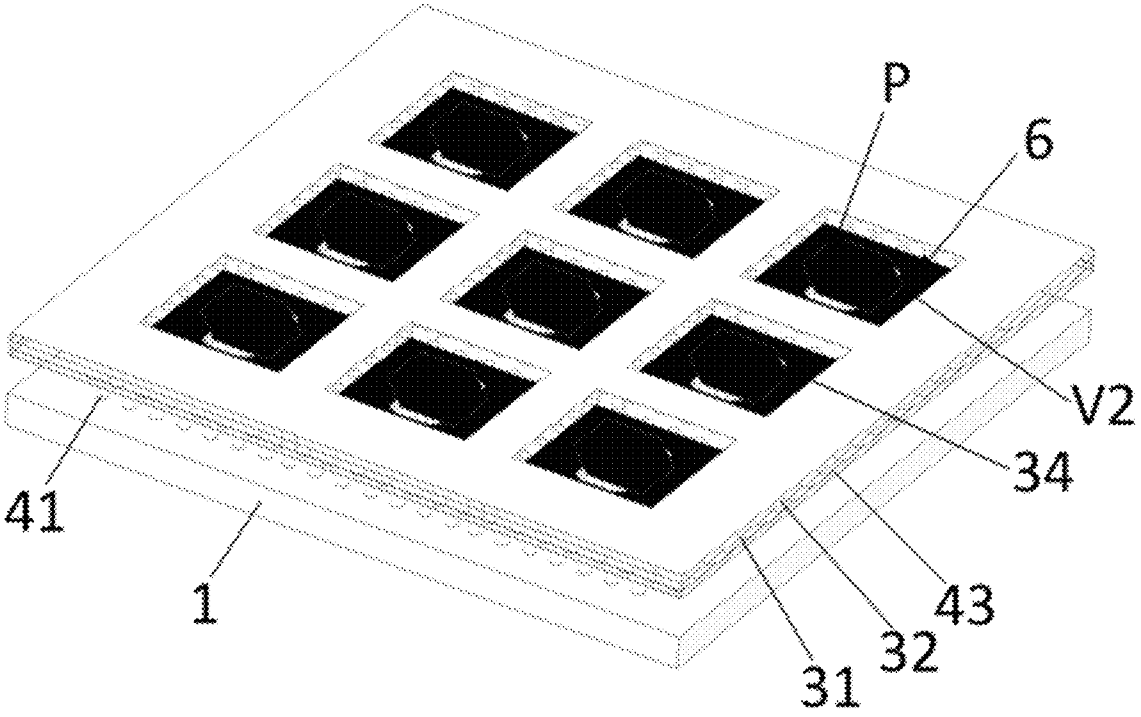
FIG. 15 is a three-dimensional structural diagram of another electromagnetic wave radiation system according to an embodiment of the present disclosure.
Figure 16:
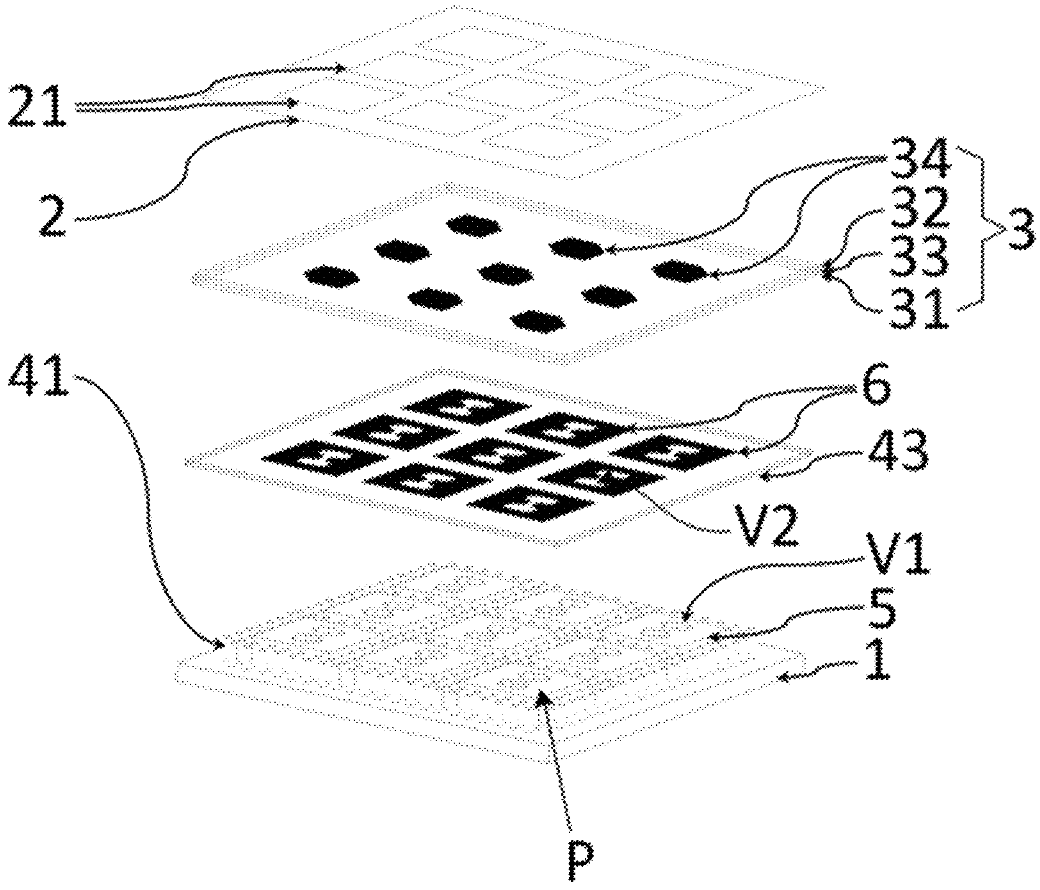
FIG. 16 is a schematic explosion diagram corresponding to FIG. 15.

In a possible implementation, in order to solve the above problem that it is difficult to drill a hole on a glass substrate to solve the electromagnetic crosstalk between the glass-based device and the circuit, an embodiment of the present disclosure provide another electromagnetic wave radiation system, as shown in FIGS. 15 and 16. FIG. 15 is a three-dimensional structural diagram of another electromagnetic wave radiation system according to an embodiment of the present disclosure. FIG. 16 is a schematic explosion diagram corresponding to FIG. 15. The electromagnetic wave radiation system includes: a first metal substrate 1; a second metal substrate 2, opposite to the first metal substrate 1; an electromagnetic wave transmission component 3, between the first metal substrate 1 and the second metal substrate 2; where the electromagnetic wave transmission component 3 includes a first glass substrate 31 and a second glass substrate 32 arranged opposite to each other, a liquid crystal layer 33 between the first glass substrate 31 and the second glass substrate 32, and a plurality of electromagnetic wave transmission structures 34 on a side of the first glass substrate 31 facing the liquid crystal layer 33; where the first glass substrate 31 is close to the first metal substrate 1; and an electromagnetic shielding structure 4, between the electromagnetic wave transmission component 3 and the first metal substrate 1, where the electromagnetic shielding structure 4 includes a plurality of shielding units P surrounded by a plurality of first metal pillars 41, the shielding units P are arranged in one-to-one correspondence with the electromagnetic wave transmission structures 34, and an orthographic projection of the electromagnetic wave transmission structure 34 on the first metal substrate 1 is within a range of an orthographic projection of the shielding unit P on the first metal substrate 1.

In the electromagnetic wave radiation system according to an embodiment of the present disclosure, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

In a specific implementation, in the above electromagnetic wave radiation system according to an embodiment of the present disclosure, as shown in FIG. 15 and FIG. 16, the electromagnetic shielding structure 4 further includes following components.

A plurality of waveguide structures 5 are disposed on a side of the first metal substrate 1 facing the second metal substrate 2. The plurality of waveguide structures 5 are arranged in one-to-one correspondence with the electromagnetic wave transmission structures 34, and the first metal pillars 41 are arranged at peripheries of the plurality of waveguide structures 5.

First ridge-shaped holes V1 penetrate through the waveguide structures 5 and the first metal substrate 1 below the waveguide structures 5.

A second dielectric substrate 43 is disposed between the waveguide structures 5 and the electromagnetic wave transmission component 3.

A plurality of first metal layers 6 are disposed on a side of the second dielectric substrate 43 facing the second metal substrate 2. A size of the first metal layer 6 is the same as a size of the waveguide structure 5. The first metal layers 6 have a second ridge-shaped holes V2 corresponding to the first ridge-shaped holes V1.

In a specific implementation, in the above electromagnetic wave radiation system according to an embodiment of the present disclosure, as shown in FIG. 15 and FIG. 16, an orthographic projection of the first ridge-shaped hole V1 on the first metal substrate 1 and an orthographic projection of the second ridge-shaped hole V2 on the first metal substrate 1 overlap with each other. In this way, the electromagnetic wave transmitted from the first ridge-shaped hole V1 is completely transmitted to the second ridge-shaped hole V2, and the transmission amount of the electromagnetic wave is increased.

In a specific implementation, in the above electromagnetic wave radiation system according to an embodiment of the present disclosure, as shown in FIG. 15 and FIG. 16, the orthographic projection of the first ridge-shaped hole V1 on the first metal substrate 1 and the orthographic projection of the second ridge-shaped hole V2 on the first metal substrate 1 may completely overlap with each other, and the orthographic projection of the first ridge-shaped hole V1 and the orthographic projection of the second ridge-shaped hole V2 on the first metal substrate 1 are located within an orthographic projection of the shielding unit P on the first metal substrate 1. In this way, an orthographic projection of a junction of a first portion 3411 and a second portion 3412 on the first metal substrate 1 can be arranged within the orthographic projection of the first ridge-shaped hole V1 and the orthographic projection of the second ridge-shaped hole V2 on the first metal substrate 1. Optionally, the orthographic projection of the junction of the first portion 3411 and the second portion 3412 on the first metal substrate 1 is arranged to partially overlap with the orthographic projection of the first ridge-shaped hole V1 on the metal substrate 1. Optionally, the orthographic projection of the junction of the first portion 3411 and the second portion 3412 on the first metal substrate 1 is arranged to overlap with an orthographic projection of a central position of the first ridge-shaped hole V1 and an orthographic projection of a central position of the second ridge-shaped hole V2 on the first metal substrate 1. That is, the orthographic projection of the junction of the first portion 3411 and the second portion 3412 on the first metal substrate 1 is arranged to be located at a central position of the shielding unit P.

In a specific implementation, in the above electromagnetic wave radiation system according to an embodiment of the present disclosure, as shown in FIGS. 15 and 16, the electromagnetic wave transmission structure 34 may be a patch antenna. The second metal substrate 2 includes a plurality of hollow structures 21 corresponding to the waveguide structures 5.

The first metal substrate 1, the waveguide structure 5, and the first ridge-shaped hole V1 FIG. 15 and FIG. 16 form a waveguide port feed network. Electromagnetic wave energy is fed from the first ridge-shaped holes V1. The first metal pillars 41 and the second metal substrate 2 form a metal-integrated gap waveguide. The second metal substrate 2 is used as a perfect electrical conductor (PEC). The first metal pillar 41 is used as a magnetic conductor (AMC), and an air gap layer is formed between an upper layer and a lower layer. After the electromagnetic wave energy is output from the waveguide port (V1), the electromagnetic wave energy is coupled up to the electromagnetic wave transmission structure 34 through the second ridge-shaped hole V2 and the air gap layer. The hollow structure 21 may enable the electromagnetic wave transmission structure 34 (patch antenna) to radiate energy into free space. The gap waveguide in FIG. 16 allows electromagnetic waves to be propagated only inside the shielding unit P due to upper and lower closed metal substrates of the gap waveguide. When being fed from the waveguide port (V1) of one of the shielding units P, the energy is transmitted through the gap waveguide to the electromagnetic wave transmission structure 34 above the gap waveguide. Therefore, the problem of electromagnetic wave crosstalk between adjacent electromagnetic wave transmission structures 34 can be effectively avoided.

It should be noted that FIG. 16 of an embodiment of the present disclosure takes waveguide feed networks of a 3×3 array as an example, which is certainly not limited thereto. Fewer than 9 waveguide feed networks are possible, and more waveguide feed networks may also be arranged.

Figure 17:
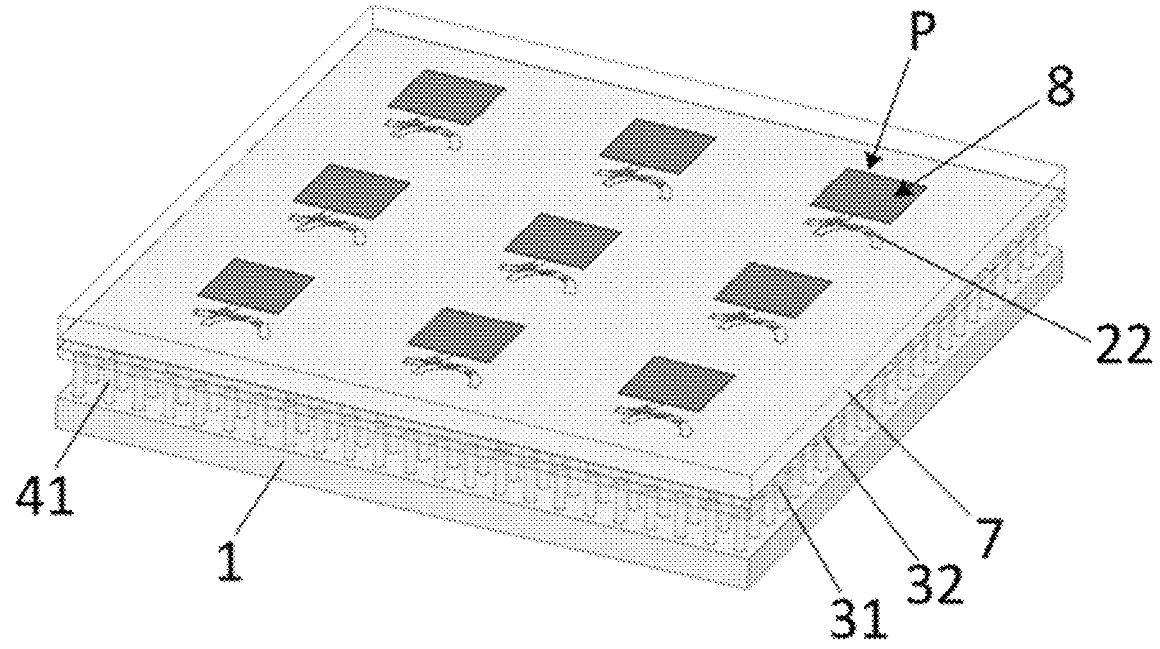
FIG. 17 is a three-dimensional structural diagram of another electromagnetic wave radiation system according to an embodiment of the present disclosure.
Figure 18:
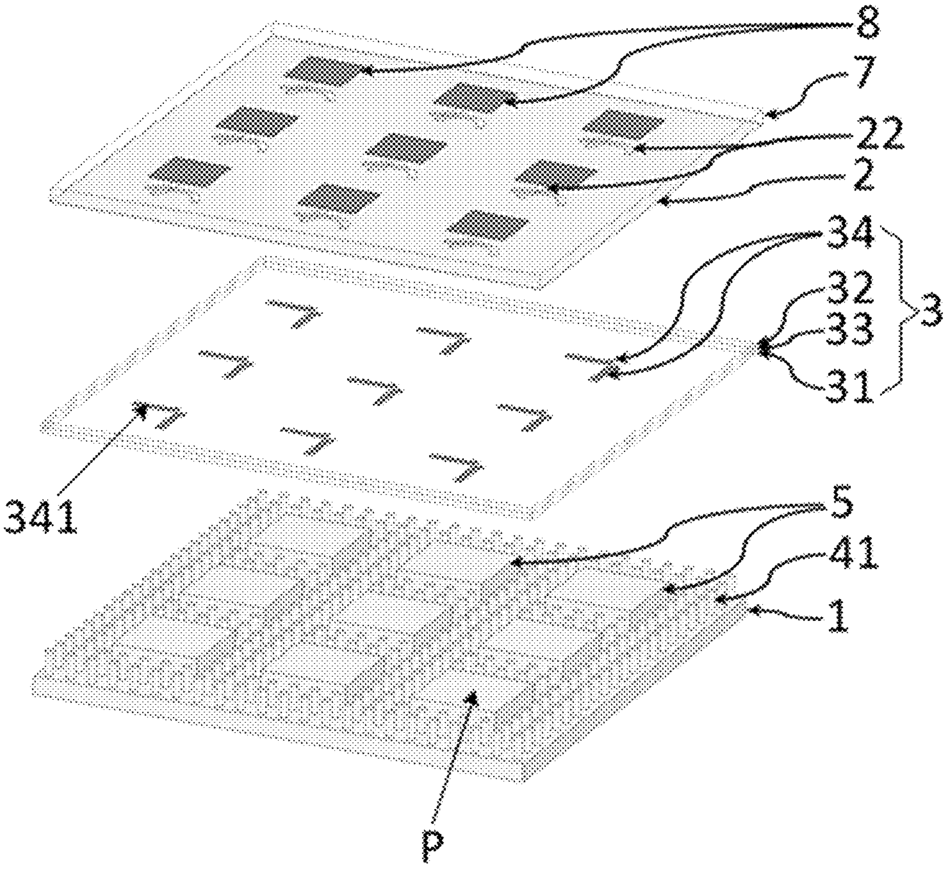
FIG. 18 is a schematic explosion diagram corresponding to FIG. 17.

In a possible implementation, in order to solve the above problem that it is difficult to drill a hole on a glass substrate to solve the electromagnetic crosstalk between the glass-based device and the circuit, an embodiment of the present disclosure provides another electromagnetic wave radiation system, as shown in FIGS. 17 and 18. FIG. 17 is a three-dimensional structural diagram of another electromagnetic wave radiation system according to an embodiment of the present disclosure. FIG. 18 is a schematic explosion diagram corresponding to FIG. 17. The electromagnetic wave radiation system includes: a first metal substrate 1; a second metal substrate 2, opposite to the first metal substrate 1; an electromagnetic wave transmission component 3, between the first metal substrate 1 and the second metal substrate 2;

where the electromagnetic wave transmission component 3 includes a first glass substrate 31 and a second glass substrate 32 arranged opposite to each other, a liquid crystal layer 33 between the first glass substrate 31 and the second glass substrate 32, and a plurality of electromagnetic wave transmission structures 34 on a side of the first glass substrate 31 facing the liquid crystal layer 33; where the first glass substrate 31 is close to the first metal substrate 1; and an electromagnetic shielding structure 4, between the electromagnetic wave transmission component 3 and the first metal substrate 1, where the electromagnetic shielding structure 4 includes a plurality of shielding units P surrounded by a plurality of first metal pillars 41, the shielding units P are arranged in one-to-one correspondence with the electromagnetic wave transmission structures 34, and an orthographic projection of the electromagnetic wave transmission structure 34 on the first metal substrate 1 is within a range of an orthographic projection of the shielding unit P on the first metal substrate 1.

In the electromagnetic wave radiation system according to an embodiment of the present disclosure, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

In a specific implementation, in the above electromagnetic wave radiation system according to an embodiment of the present disclosure, as shown in FIGS. 17 and 18, the electromagnetic wave radiation system further includes following components.

A plurality of waveguide structures 5 are disposed on a side of the first metal substrate 1 facing the second metal substrate 2. The plurality of waveguide structures 5 are arranged in one-to-one correspondence with the electromagnetic wave transmission structures 34, and the first metal pillars 41 are arranged at peripheries of the plurality of waveguide structures 5.

A fourth dielectric substrate 7 is disposed on a side of the second metal substrate 2 away from the first metal substrate 1.

A plurality of radiation patches 8 are disposed on a side of the fourth dielectric substrate 7 away from the first metal substrate 1.

A plurality of opening structures 22 are disposed on the second metal substrate 2, and the opening structures 22 are arranged in one-to-one correspondence with the electromagnetic wave transmission structures 34.

In a specific implementation, in the above electromagnetic wave radiation system according to an embodiment of the present disclosure, as shown in FIGS. 17 and 18, a shape the radiation patch 8 is a quadrangle. Of course, the shape of the radiation patch 8 may also be other shapes such as a hexagon, which is not limited by an embodiment of the present disclosure.

In a specific implementation, in the above electromagnetic wave radiation system according to an embodiment of the present disclosure, as shown in FIGS. 17 and 18, a shape of the opening structure 22 is an arc. The electromagnetic wave transmission structure 34 includes two strip lines 341 extending in intersected directions. A quantity of the opening structures 22 corresponding to each electromagnetic wave transmission structure 34 and a quantity of strip lines 341 included in each electromagnetic wave transmission structure 34 are the same.

The electromagnetic wave transmission component 3 in FIGS. 17 and 18 forms a waveguide port feed network. Electromagnetic wave energy is fed from the electromagnetic wave transmission structure 34. The first metal substrate 1, the first metal pillars 41, and the second metal substrate 2 form a metal gap waveguide. The second metal substrate 2 is used as a perfect electrical conductor (PEC). The first metal pillar 41 is used as a magnetic conductor (AMC), and an air gap layer is formed between an upper layer and a lower layer. Electromagnetic wave energy is transmitted from the electromagnetic wave transmission structure 34, after passing through the opening structure 22, the electromagnetic wave energy is coupled to the radiation patch 8 and is radiated to the free space. The gap waveguide in FIG. 17 and FIG. 18 allows electromagnetic waves to be propagated only inside the shielding unit P due to upper and lower closed metal substrates of the gap waveguide. When being fed from one of the electromagnetic wave transmission structures 34, the energy is transmitted through the gap waveguide to the radiation patch 8 above the gap waveguide. Therefore, the problem of electromagnetic wave crosstalk between adjacent electromagnetic wave transmission structures 34 can be effectively avoided.

It should be noted that FIG. 18 of an embodiment of the present disclosure takes waveguide feed networks of a 3×3 array as an example, which is certainly not limited thereto. Fewer than 9 waveguide feed networks are possible, and more waveguide feed networks may also be arranged.

Figure 19:
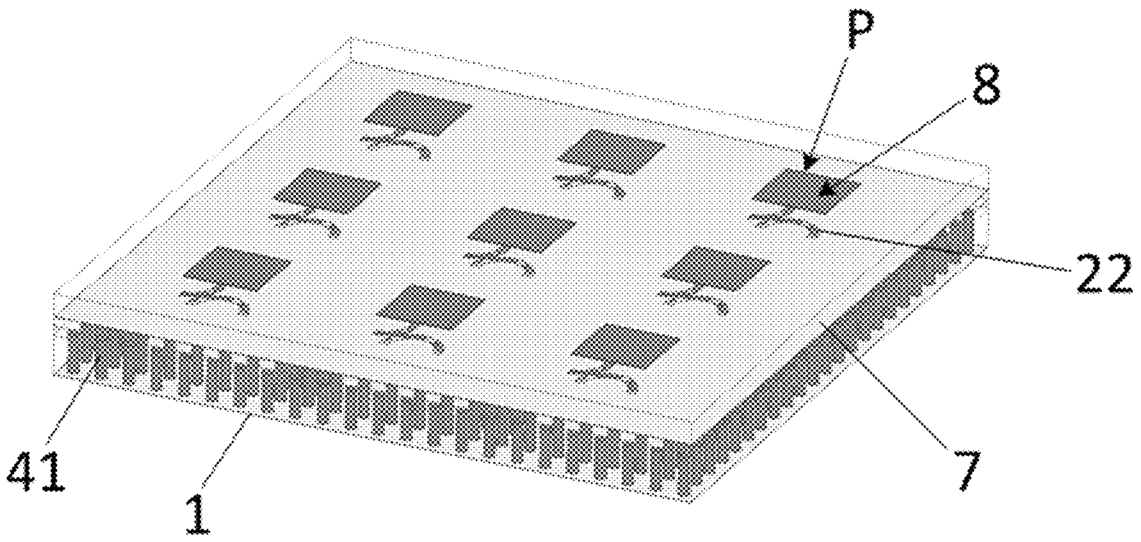
FIG. 19 is a three-dimensional structural diagram of another electromagnetic wave radiation system according to an embodiment of the present disclosure.
Figure 20:
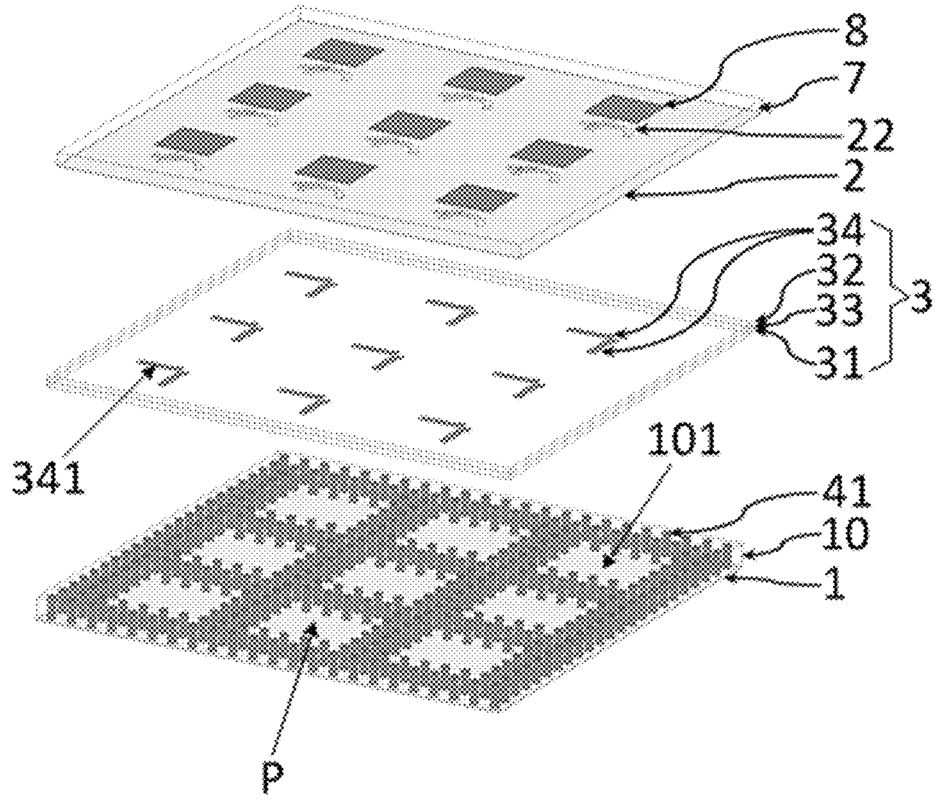
FIG. 20 is a schematic explosion diagram corresponding to FIG. 19.

In a possible implementation, in order to solve the above problem that it is difficult to drill a hole on a glass substrate to solve the electromagnetic crosstalk between the glass-based device and the circuit, an embodiment of the present disclosure provides another electromagnetic wave radiation system, as shown in FIGS. 19 and 20. FIG. 19 is a three-dimensional structural diagram of another electromagnetic wave radiation system according to an embodiment of the present disclosure. FIG. 20 is a schematic explosion diagram corresponding to FIG. 19. The electromagnetic wave radiation system includes: a first metal substrate 1; a second metal substrate 2, opposite to the first metal substrate 1; an electromagnetic wave transmission component 3, between the first metal substrate 1 and the second metal substrate 2; where the electromagnetic wave transmission component 3 includes a first glass substrate 31 and a second glass substrate 32 arranged opposite to each other, a liquid crystal layer 33 between the first glass substrate 31 and the second glass substrate 32, and a plurality of electromagnetic wave transmission structures 34 on a side of the first glass substrate 31 facing the liquid crystal layer 33; where the first glass substrate 31 is close to the first metal substrate 1; and an electromagnetic shielding structure 4, between the electromagnetic wave transmission component 3 and the first metal substrate 1, where the electromagnetic shielding structure 4 includes a plurality of shielding units P surrounded by a plurality of first metal pillars 41, the shielding units P are arranged in one-to-one correspondence with the electromagnetic wave transmission structures 34, and an orthographic projection of the electromagnetic wave transmission structure 34 on the first metal substrate 1 is within a range of an orthographic projection of the shielding unit P on the first metal substrate 1.

In the electromagnetic wave radiation system according to an embodiment of the present disclosure, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

In a specific implementation, in the above electromagnetic wave radiation system according to an embodiment of the present disclosure, as shown in FIGS. 19 and 20, the electromagnetic shielding structure 4 further includes following components.

A third dielectric substrate 10 is disposed between the first metal substrate 1 and the electromagnetic wave transmission component 3. The third dielectric substrate 10 includes a plurality of second cavities 101 arranged in one-to-one correspondence with the electromagnetic wave transmission structures 34. The first metal pillars 41 are embedded at peripheries of the second cavities 101 at intervals in the third dielectric substrate 10.

The electromagnetic wave radiation system further includes following components.

A fourth dielectric substrate 7 is disposed on a side of the second metal substrate 2 away from the first metal substrate 1.

A plurality of radiation patches 8 are disposed on a side of the fourth dielectric substrate 7 away from the first metal substrate 1.

A plurality of opening structures 22 are disposed on the second metal substrate, and the opening structures 22 are arranged in one-to-one correspondence with the electromagnetic wave transmission structures 34.

In a specific implementation, in the above electromagnetic wave radiation system according to an embodiment of the present disclosure, as shown in FIGS. 19 and 20, a shape of the radiation patch 8 is a quadrangle. Of course, the shape of the radiation patch 8 may also be other shapes such as a hexagon, which is not limited by an embodiment of the present disclosure.

In a specific implementation, in the above electromagnetic wave radiation system according to an embodiment of the present disclosure, as shown in FIGS. 19 and 20, a shape of the opening structure 22 is an arc. The electromagnetic wave transmission structure 34 includes two strip lines 341 extending in intersected directions. A quantity of the opening structures 22 corresponding to each electromagnetic wave transmission structure 34 and a quantity of strip lines 341 included in each electromagnetic wave transmission structure 34 are the same.

In a specific implementation, in the above electromagnetic wave radiation system according to an embodiment of the present disclosure, as shown in FIGS. 19 and 20, at least two rings of the first metal pillars 41 are arranged at a periphery of each of the plurality of shielding units P. In an embodiment of the present disclosure, two rings of the first metal pillars 41 are arranged at the periphery of each shielding unit P as an example, and more rings of the first metal pillars 41 can be arranged, which is not limited by the present disclosure.

The electromagnetic wave transmission component 3 in FIGS. 19 and 20 forms a waveguide port feed network. Electromagnetic wave energy is fed from the electromagnetic wave transmission structure 34. The first metal substrate 1, the third dielectric substrate 10, the first metal pillars 41, and the second metal substrate 2 form a substrate-integrated gap waveguide. The second metal substrate 2 is used as a perfect electric conductor (PEC). The first metal pillar 41 is used as a magnetic conductor (AMC), and an air gap layer is formed between an upper layer and a lower layer. Electromagnetic wave energy is transmitted from the electromagnetic wave transmission structure 34, after passing through the aperture structure 22, the electromagnetic wave energy is coupled to the radiation patch 8 and is radiated to the free space. The gap waveguide in FIG. 19 and FIG. 20 allows electromagnetic waves to be propagated only inside the shielding unit P due to upper and lower closed metal substrates of the gap waveguide. When being fed from one of the electromagnetic wave transmission structures 34, the energy is transmitted through the gap waveguide to the radiation patch 8 above the gap waveguide. Therefore, the problem of electromagnetic wave crosstalk between adjacent electromagnetic wave transmission structures 34 can be effectively avoided.

It should be noted that FIG. 20 of an embodiment of the present disclosure takes waveguide feed networks of a 3×3 array as an example, which is certainly not limited thereto. Fewer than 9 waveguide feed networks are possible, and more waveguide feed networks may be arranged.

Figure 21:
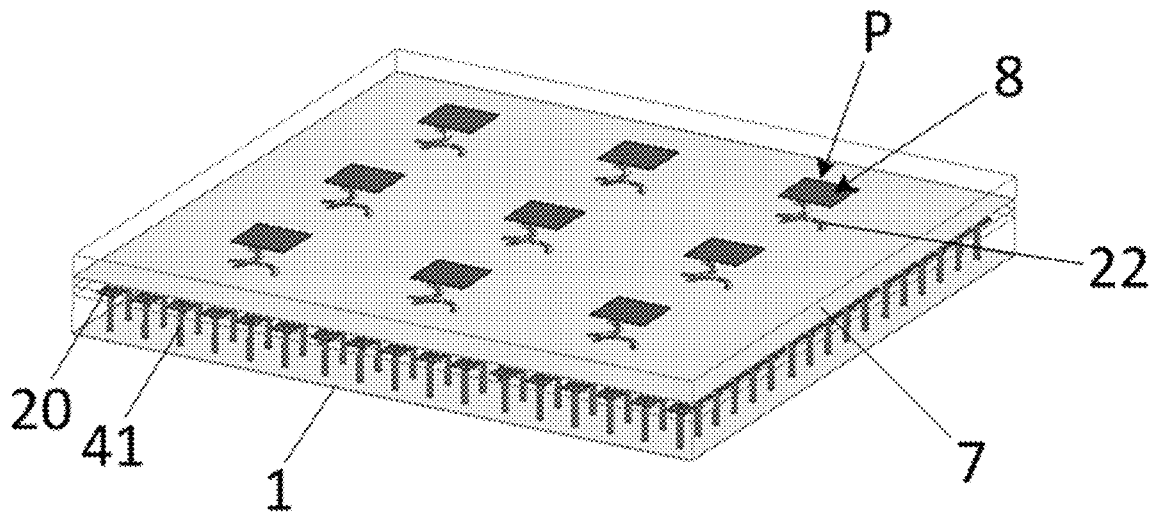
FIG. 21 is a three-dimensional structural diagram of another electromagnetic wave radiation system according to an embodiment of the present disclosure.
Figure 22:
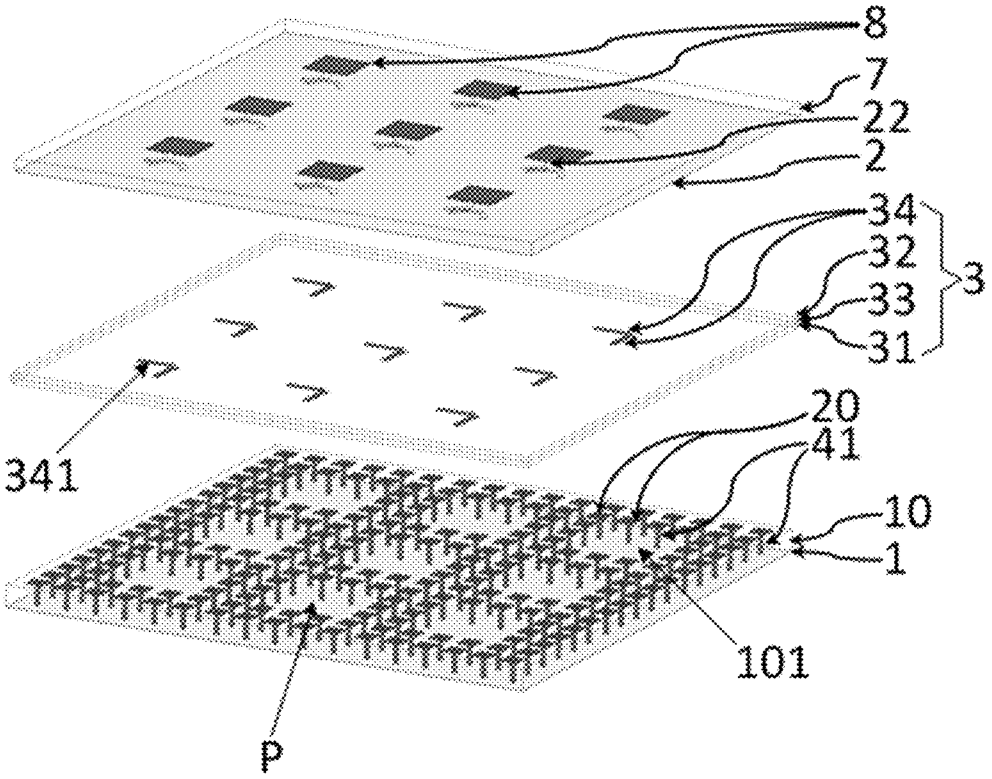
FIG. 22 is a schematic explosion diagram corresponding to FIG. 21.

In a possible implementation, in order to solve the above problem that it is difficult to drill a hole on a glass substrate to solve the electromagnetic crosstalk between a glass-based device and a circuit, an embodiment of the present disclosure provides another electromagnetic wave radiation system, as shown in FIGS. 21 and 22. FIG. 21 is a three-dimensional structural diagram of another electromagnetic wave radiation system according to an embodiment of the present disclosure. FIG. 22 is a schematic explosion diagram corresponding to FIG. 21. The electromagnetic wave radiation system includes: a first metal substrate 1; a second metal substrate 2, opposite to the first metal substrate 1; an electromagnetic wave transmission component 3, between the first metal substrate 1 and the second metal substrate 2; where the electromagnetic wave transmission component 3 includes a first glass substrate 31 and a second glass substrate 32 arranged opposite to each other, a liquid crystal layer 33 between the first glass substrate 31 and the second glass substrate 32, and a plurality of electromagnetic wave transmission structures 34 on a side of the first glass substrate 31 facing the liquid crystal layer 33; where the first glass substrate 31 is close to the first metal substrate 1; and an electromagnetic shielding structure 4, between the electromagnetic wave transmission component 3 and the first metal substrate 1, where the electromagnetic shielding structure 4 includes a plurality of shielding units P surrounded by a plurality of first metal pillars 41, the shielding units P are arranged in one-to-one correspondence with the electromagnetic wave transmission structures 34, and an orthographic projection of the electromagnetic wave transmission structure 34 on the first metal substrate 1 is within a range of an orthographic projection of the shielding unit P on the first metal substrate 1.

In the electromagnetic wave radiation system according to an embodiment of the present disclosure, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

In a specific implementation, in the above electromagnetic wave radiation system according to an embodiment of the present disclosure, as shown in FIGS. 21 and 22, the electromagnetic shielding structure 4 further includes following components.

A third dielectric substrate 10 is disposed between the first metal substrate 1 and the electromagnetic wave transmission component 3. The third dielectric substrate 10 includes a plurality of second cavities 101 arranged in one-to-one correspondence with the electromagnetic wave transmission structures 34. The first metal pillars 41 are embedded at peripheries of the second cavities 101 at intervals in the third dielectric substrate 10.

The electromagnetic wave radiation system further includes following components.

A fourth dielectric substrate 7 is disposed on a side of the second metal substrate 2 away from the first metal substrate 1.

A plurality of radiation patches 8 are disposed on a side of the fourth dielectric substrate 7 away from the first metal substrate 1.

A plurality of opening structures 22 are disposed on the second metal substrate, and the opening structures 22 are arranged in one-to-one correspondence with the electromagnetic wave transmission structures 34.

In a specific implementation, in the above electromagnetic wave radiation system according to an embodiment of the present disclosure, as shown in FIGS. 21 and 22, a shape of the radiation patch 8 is a quadrangle. Of course, the shape of the radiation patch 8 may also be other shapes such as a hexagon, which is not limited by an embodiment of the present disclosure.

In a specific implementation, in the above electromagnetic wave radiation system according to an embodiment of the present disclosure, as shown in FIGS. 21 and 22, a shape of the opening structure 22 is an arc. The electromagnetic wave transmission structure 34 includes two strip lines 341 extending in intersected directions. A quantity of the opening structures 22 corresponding to each electromagnetic wave transmission structure 34 and a quantity of strip lines 341 included in each electromagnetic wave transmission structure 34 are the same.

In a specific implementation, in the above electromagnetic wave radiation system according to an embodiment of the present disclosure, as shown in FIGS. 21 and 22, the electromagnetic shielding structure further includes following components.

A plurality of metal sheets 20 are arranged at intervals on a side of the third dielectric substrate 10 facing the electromagnetic wave transmission component 3, and in contact with the first metal pillars 41 in one-to-one correspondence. The first metal pillar 41 and the metal sheet 20 above the first metal pillar 41 form a mushroom-shaped metal structure. The mushroom-shaped metal structure is generally used as an electromagnetic band gap (EBG) structure.

In a specific implementation, in the above electromagnetic wave radiation system according to an embodiment of the present disclosure, as shown in FIGS. 21 and 22, at least two rings of the first metal pillars 41 are arranged at a periphery of each of the plurality of shielding units P. In an embodiment of the present disclosure, two rings of the first metal pillars 41 are arranged at the periphery of each shielding unit P as an example, and more rings of the first metal pillars 41 can be arranged, which is not limited by the present disclosure.

The electromagnetic wave transmission component 3 in FIGS. 21 and 22 forms a waveguide port feed network. Electromagnetic wave energy is fed from the electromagnetic wave transmission structure 34. The first metal substrate 1, the third dielectric substrate 10, the first metal pillar 41, and the second metal substrate 2 form an electromagnetic band gap (EBG) structure. The EBG has the same stop band characteristics as the gap waveguide described above, and can shield electromagnetic crosstalk in the electromagnetic wave transmission component 3. The electromagnetic wave energy is transmitted from the electromagnetic wave transmission structure 34, passes through the opening structure 22, is coupled to the radiation patch 8, and is radiated to the free space.

It should be noted that FIG. 22 of an embodiment of the present disclosure takes waveguide feed networks of a 3×3 array as an example, which is certainly not limited thereto. Fewer than 9 waveguide feed networks are possible, and more waveguide feed networks may be arranged.

Figure 23:
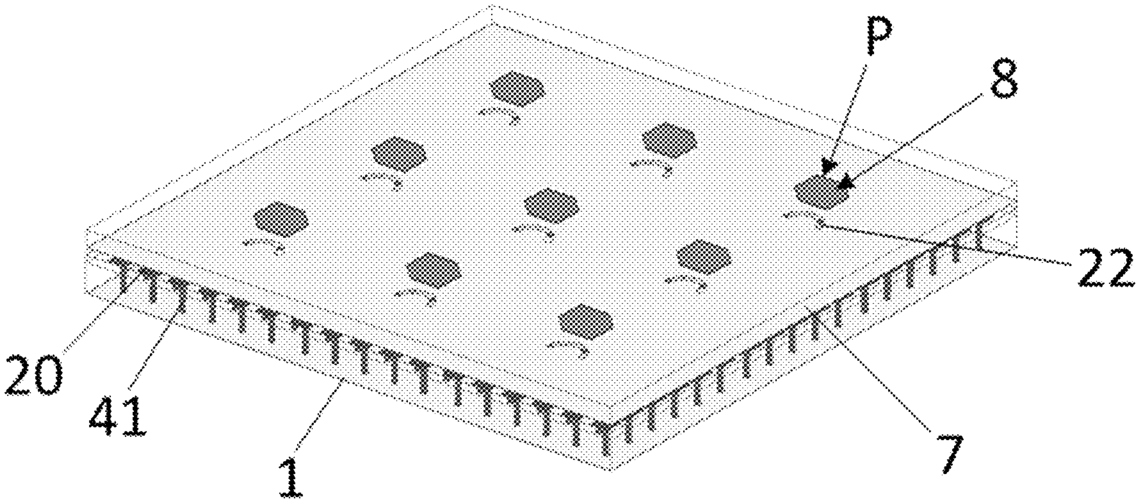
FIG. 23 is a three-dimensional structural diagram of another electromagnetic wave radiation system according to an embodiment of the present disclosure.
Figure 24:
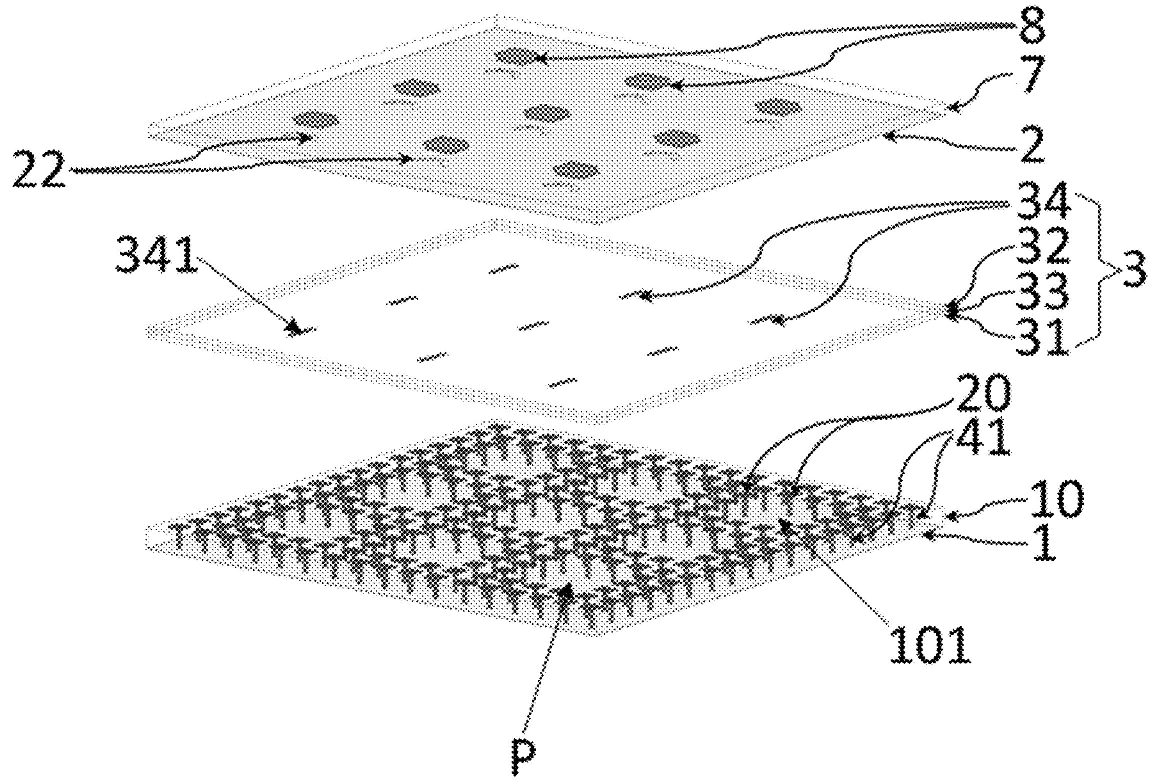
FIG. 24 is a schematic explosion diagram corresponding to FIG. 23.

In a possible implementation, in order to solve the above problem that it is difficult to drill a hole on a glass substrate to solve the electromagnetic crosstalk between a glass-based device and a circuit, an embodiment of the present disclosure provides another electromagnetic wave radiation system, as shown in FIGS. 23 and 24. FIG. 23 is a three-dimensional structural diagram of another electromagnetic wave radiation system according to an embodiment of the present disclosure. FIG. 24 is a schematic explosion diagram corresponding to FIG. 23. The electromagnetic wave radiation system includes: a first metal substrate 1; a second metal substrate 2, opposite to the first metal substrate 1; an electromagnetic wave transmission component 3, between the first metal substrate 1 and the second metal substrate 2; where the electromagnetic wave transmission component 3 includes a first glass substrate 31 and a second glass substrate 32 arranged opposite to each other, a liquid crystal layer 33 between the first glass substrate 31 and the second glass substrate 32, and a plurality of electromagnetic wave transmission structures 34 on a side of the first glass substrate 31 facing the liquid crystal layer 33; where the first glass substrate 31 is close to the first metal substrate 1; and an electromagnetic shielding structure 4, between the electromagnetic wave transmission component 3 and the first metal substrate 1, where the electromagnetic shielding structure 4 includes a plurality of shielding units P surrounded by a plurality of first metal pillars 41, the shielding units P are arranged in one-to-one correspondence with the electromagnetic wave transmission structures 34, and an orthographic projection of the electromagnetic wave transmission structure 34 on the first metal substrate 1 is within a range of an orthographic projection of the shielding unit P on the first metal substrate 1.

In the electromagnetic wave radiation system according to an embodiment of the present disclosure, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

In a specific implementation, in the above electromagnetic wave radiation system according to an embodiment of the present disclosure, as shown in FIGS. 23 and 24, the electromagnetic shielding structure 4 further includes following components.

A third dielectric substrate 10 is disposed between the first metal substrate 1 and the electromagnetic wave transmission component 3. The third dielectric substrate 10 includes a plurality of second cavities 101 arranged in one-to-one correspondence with the electromagnetic wave transmission structures 34. The first metal pillars 41 are embedded at peripheries of the second cavities 101 at intervals in the third dielectric substrate 10.

The electromagnetic wave radiation system further includes following components.

A fourth dielectric substrate 7 is disposed on a side of the second metal substrate 2 away from the first metal substrate 1.

A plurality of radiation patches 8 are disposed on a side of the fourth dielectric substrate 7 away from the first metal substrate 1.

A plurality of opening structures 22 are disposed on the second metal substrate, and the opening structures 22 are arranged in one-to-one correspondence with the electromagnetic wave transmission structures 34.

In a specific implementation, in the above electromagnetic wave radiation system according to an embodiment of the present disclosure, as shown in FIGS. 23 and 24, a shape of the radiation patch 8 is a hexagon. Of course, the shape of the radiation patch 8 may also be other shapes such as a quadrangle, which is not limited by an embodiment of the present disclosure.

In a specific implementation, in the above electromagnetic wave radiation system according to an embodiment of the present disclosure, as shown in FIGS. 23 and 24, the electromagnetic shielding structure further includes following components.

A plurality of metal sheets 20 are disposed at intervals on a side of the third dielectric substrate 10 facing the electromagnetic wave transmission component 3, and in contact with the first metal pillars 41 in one-to-one correspondence. The first metal pillar 41 and the metal sheet 20 above the first metal pillar 41 form a mushroom-shaped metal structure. The mushroom-shaped metal structure is generally used as an electromagnetic band gap (EBG) structure.

In a specific implementation, in the above electromagnetic wave radiation system according to an embodiment of the present disclosure, as shown in FIGS. 23 and 24, a shape of the opening structure 22 is an arc. The electromagnetic wave transmission structure 34 includes a strip line 341. A quantity of the opening structures 22 corresponding to each electromagnetic wave transmission structure 34 and a quantity of strip lines 341 included in each electromagnetic wave transmission structure 34 are the same.

In a specific implementation, in the above electromagnetic wave radiation system according to an embodiment of the present disclosure, as shown in FIGS. 23 and 24, at least two rings of the first metal pillars 41 are arranged at a periphery of each of the plurality of shielding units P. In an embodiment of the present disclosure, two rings of the first metal pillars 41 are arranged at the periphery of each shielding unit P as an example, and more rings of the first metal pillars 41 can be arranged, which is not limited by the present disclosure.

The electromagnetic wave transmission component 3 in FIGS. 23 and 24 forms a waveguide port feed network. Electromagnetic wave energy is fed from the electromagnetic wave transmission structure 34. The first metal substrate 1, the third dielectric substrate 10, the first metal pillar 41, and the second metal substrate 2 form an electromagnetic band gap (EBG) structure. The EBG has the same stop band characteristics as the gap waveguide described above, and can shield electromagnetic crosstalk in the electromagnetic wave transmission component 3. The electromagnetic wave energy is transmitted from the electromagnetic wave transmission structure 34, passes through the opening structure 22, is coupled to the radiation patch 8, and is radiated to the free space.

It should be noted that FIG. 24 of an embodiment of the present disclosure takes waveguide feed networks of a 3×3 array as an example, which is certainly not limited thereto. Fewer than 9 waveguide feed networks are possible, and more waveguide feed networks may be arranged.

In a specific implementation, the structure for electromagnetic shielding according to the present disclosure is a gap waveguide and an electromagnetic band gap structure, but are not limited to these two structures. Any periodic structure with band stop characteristics belongs to the content protected by embodiments of the present disclosure, which will not be listed here.

Figure 7:
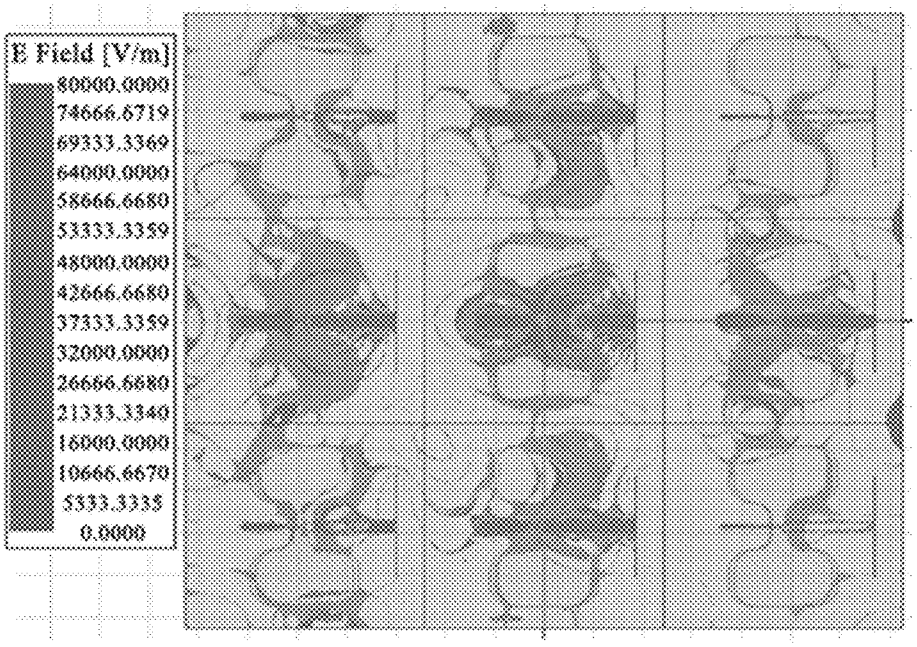
FIG. 7 illustrates excitation of a central waveguide port of 3×3 waveguide port feed networks.
Figure 8:
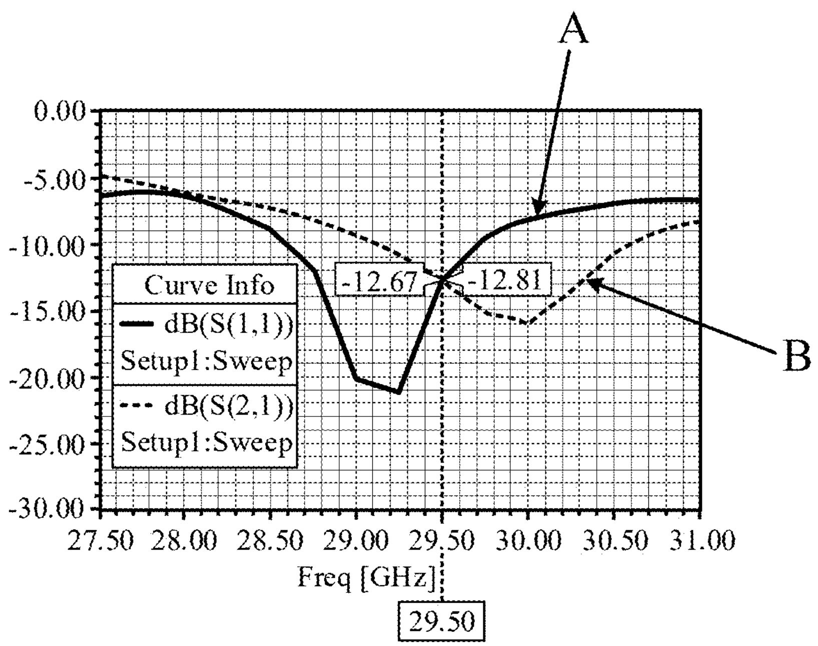
FIG. 8 is a schematic diagram of simulation parameters corresponding to FIG. 7.
Figure 9:
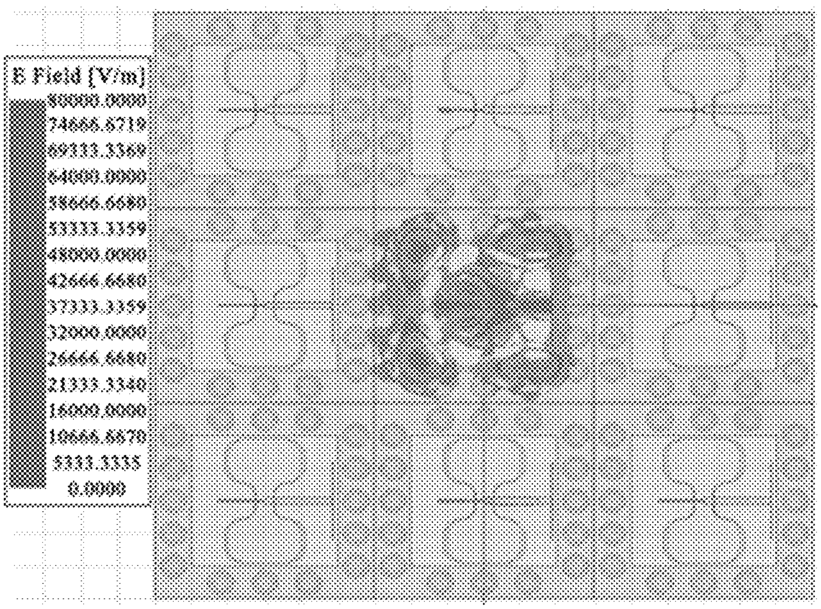
FIG. 9 illustrates excitation of a center waveguide port of 3×3 waveguide port feed networks.
Figure 10:
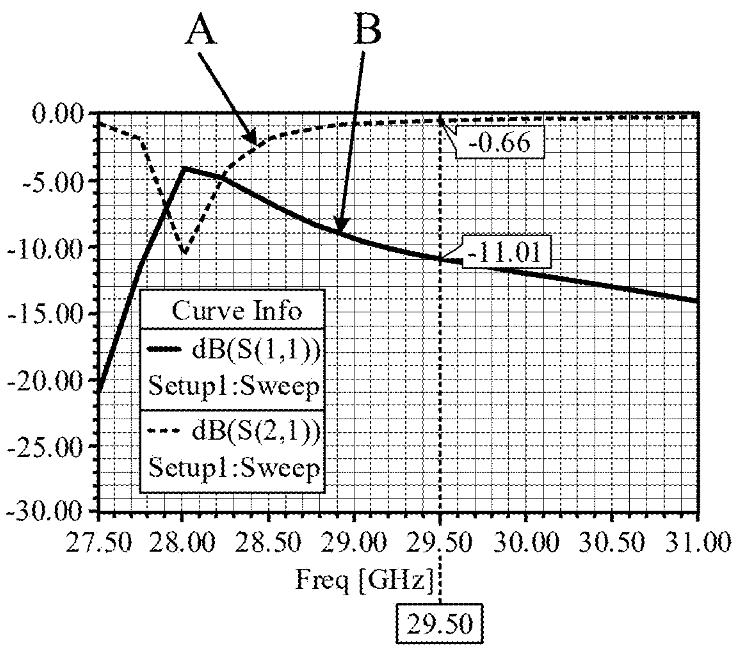
FIG. 10 is a schematic diagram of simulation parameters corresponding to FIG. 9.

Taking the electromagnetic wave radiation system shown in FIG. 1 and FIG. 2 as an example, the present disclosure verifies the electromagnetic crosstalk of the Ka-band electromagnetic wave transmitted in the electromagnetic wave radiation system shown in FIG. 1. As shown in FIG. 7, FIG. 7 illustrates excitation of a center waveguide port of 3×3 waveguide port feed networks. FIG. 7 is an electric field distribution diagram in the electromagnetic wave transmission component 3 when the gap waveguide structure shown in FIG. 1 is not arranged. It can be seen that not all of the electromagnetic waves are transmitted to the electromagnetic wave transmission structure 34 of the central unit, but crosstalk is generated in the electromagnetic wave transmission component 3. FIG. 8 is a schematic diagram of simulation parameters corresponding to FIG. 7. A curve A is the electromagnetic wave energy reflected back from the electromagnetic wave transmission structure 34, and a curve B is the electromagnetic wave energy radiated from the electromagnetic wave transmission structure 34, which also demonstrate the influence of electromagnetic wave crosstalk on the transmission performance. FIG. 9 illustrates excitation of a center waveguide port of 3×3 waveguide port feed networks. FIG. 9 is an electric field distribution diagram in the electromagnetic wave transmission component 3 after the gap waveguide structure shown in FIG. 1 is arranged. It can be seen that the energy transmitted by the central waveguide is well confined in the central unit and is transmitted to the central electromagnetic wave transmission structure 34. There is almost no electric field in the electromagnetic wave transmission component 3 inside other units. The effective shielding effect of the gap waveguide structure on the electromagnetic crosstalk in the electromagnetic wave transmission component 3 is proved. FIG. 10 is a schematic diagram of simulation parameters corresponding to FIG. 9. It can be seen that the transmission performance of the waveguide port is significantly improved.

To sum up, the electromagnetic wave radiation system according to embodiments of the present disclosure has at least following advantages.

1, the glass drilling process with extremely high difficulty is avoided, and the electromagnetic crosstalk in the glass-based electromagnetic wave transmission structure is effectively shielded.

2, the overall working performance of the electromagnetic wave radiation system can be effectively improved.

3, the electromagnetic wave radiation system is compact in structure and high in integration level.

4, the electromagnetic wave radiation system has low process precision and can be produced in mas.

Base on the same inventive concept, an embodiment of the present disclosure further provides a communication device, including any of the above electromagnetic wave radiation systems according to embodiments of the present disclosure. Other essential components of the communication device are understood by those of ordinary skill in the art. It is not intended to be exhaustive or to be limiting of the present disclosure. For the implementation of the communication device, reference may be made to embodiments of the electromagnetic wave radiation system, and the repetition thereof is omitted.

Embodiments of the present disclosure provide an electromagnetic wave radiation system and communication device, a plurality of shielding units surrounded by a plurality of first metal pillars are arranged between the electromagnetic wave transmission structure and the first metal substrate, the plurality of shielding units may form a periodic structure having a stop band characteristic, so that the energy of the electromagnetic wave is well bound in the shielding unit and transmitted to the electromagnetic wave transmission structure. Therefore, the electromagnetic shielding structure can effectively solve the problem of electromagnetic energy crosstalk between different electromagnetic wave transmission structures in the electromagnetic wave transmission structures. In addition, by arranging an electromagnetic shielding structure according to the present disclosure, a glass drilling process with extremely high processing difficulty can be avoided to solve the problem of electromagnetic energy crosstalk. Therefore, the present disclosure can effectively improve the overall working performance of the electromagnetic wave radiation system.

Although embodiments of the present disclosure have been described, those of skill in the art may otherwise make various modifications and variations to these embodiments once they are aware of the basic inventive concept. Therefore, the claims intend to include embodiments as well as all these modifications and variations falling within the scope of the present disclosure.

Apparently, those skilled in the art can make various modifications and variations to embodiments of the present disclosure without departing from the spirit and scope of embodiments of the present disclosure. In this way, if the modifications and variations of embodiments of the present disclosure fall within the scope of the claims of the present disclosure and their equivalent technologies, the present disclosure is also intended to include these modifications and variations.

What is claimed is:

1. An electromagnetic wave radiation system, comprising:

a first metal substrate;

a second metal substrate, opposite to the first metal substrate;

an electromagnetic wave transmission component, between the first metal substrate and the second metal substrate; wherein the electromagnetic wave transmission component comprises a first glass substrate and a second glass substrate arranged opposite to each other, a liquid crystal layer between the first glass substrate and the second glass substrate, and a plurality of electromagnetic wave transmission structures on a side of that first glass substrate facing the liquid crystal layer; the first glass substrate is close to the first metal substrate; and an electromagnetic shielding structure, between the electromagnetic wave transmission component and the first metal substrate, wherein the electromagnetic shielding structure comprises a plurality of shielding units surrounded by a plurality of first metal pillars, the shielding units are arranged in one-to-one correspondence with the electromagnetic wave transmission structures, and an orthographic projection of the electromagnetic wave transmission structure on the first metal substrate is within a range of an orthographic projection of the shielding unit on the first metal substrate.

2. The electromagnetic wave radiation system according to claim 1, wherein the electromagnetic shielding structure further comprises:

a first dielectric substrate, between the first metal substrate and the electromagnetic wave transmission component, wherein the first dielectric substrate comprises a plurality of first cavities arranged in one-to-one correspondence with the electromagnetic wave transmission structures, and the plurality of first metal pillars are embedded at peripheries of the plurality of first cavities at intervals in the first dielectric substrate;

a second dielectric substrate, between the first dielectric substrate and the electromagnetic wave transmission component;

a plurality of second metal pillars embedded in the second dielectric substrate at intervals and in contact with the first metal pillars in one-to-one correspondence.

3. The electromagnetic wave radiation system according to claim 2, further comprising:

a plurality of waveguide structures, on a side of the first metal substrate facing the second metal substrate, wherein the plurality of waveguide structures are arranged in one-to-one correspondence with the first cavities, an orthographic projection of the first cavity on the first metal substrate coincides with an orthographic projection of the waveguide structure on the first metal substrates, and the first dielectric substrate is embedded at peripheries of the plurality of waveguide structures through the first cavities;

first ridge-shaped holes, penetrating through the waveguide structures and the first metal substrate below the waveguide structures;

a plurality of first metal layers, on a side of the second dielectric substrate facing the second metal substrate, and arranged in one-to-one correspondence with the waveguide structures, wherein the first metal layers have second ridge-shaped holes corresponding to the first ridge-shaped holes in one-to-one correspondence.

4. The electromagnetic wave radiation system according to claim 3, wherein the electromagnetic wave transmission structures are patch antennas; the second metal substrate comprises a plurality of hollow structures arranged in one-to-one correspondence with the patch antennas.

5. The electromagnetic wave radiation system according to claim 3, wherein the electromagnetic wave transmission structure comprises a strip line.

6. The electromagnetic wave radiation system according to claim 5, wherein the strip line comprises a first portion and a second portion connected in the same direction, and a width of the first portion and a width of the second portion are different.

7. The electromagnetic wave radiation system according to claim 6, wherein an orthographic projection of a junction of the first portion and the second portion on the first metal substrate partially overlaps with an orthographic projection of the ridge-shaped hole on the first metal substrate.

8. The electromagnetic wave radiation system according to claim 1, further comprising:

a plurality of waveguide structures, on a side of the first metal substrate facing the second metal substrate, wherein the waveguide structures and the electromagnetic wave transmission structures are arranged in one-to-one correspondence, and the first metal pillars are arranged at peripheries of the plurality of waveguide structures.

9. The electromagnetic wave radiation system according to claim 8, further comprising:

first ridge-shaped holes, penetrating through the waveguide structures and the first metal substrate below the waveguide structures;

a second dielectric substrate, between the waveguide structures and the electromagnetic wave transmission component;

a plurality of first metal layers, on a side of the second dielectric substrate facing the second metal substrate, and arranged in one-to-one correspondence with the waveguide structures, wherein the first metal layers have second ridge-shaped holes corresponding to the first ridge-shaped holes in one-to-one correspondence.

10. The electromagnetic wave radiation system according to claim 9, wherein a size of the first metal layer is the same as a size of the waveguide structure.

11. The electromagnetic wave radiation system according to claim 9, wherein an orthographic projection of the first ridge-shaped hole on the first metal substrate and an orthographic projection of the second ridge-shaped hole on the first metal substrate overlap with each other.

12. The electromagnetic wave radiation system according to claim 8, further comprising:

a fourth dielectric substrate, on a side of the second metal substrate away from the first metal substrate;

a plurality of radiation patches, on a side of the fourth dielectric substrate away from the first metal substrate;

a plurality of opening structures, on the second metal substrate, wherein the opening structures are arranged in one-to-one correspondence with the electromagnetic wave transmission structures.

13. The electromagnetic wave radiation system according to claim 12, wherein a shape of the radiation patch comprises a quadrangle or a hexagon.

14. The electromagnetic wave radiation system according to claim 12, wherein a shape of the opening structure is an arc.

15. The electromagnetic wave radiation system according to claim 12, wherein the electromagnetic wave transmission structure comprises two strip lines extending in intersected directions.

16. The electromagnetic wave radiation system according to claim 15, wherein a quantity of the opening structures corresponding to each of the electromagnetic wave transmission structures and a quantity of the strip lines comprised in each of the electromagnetic wave transmission structures are the same.

17. The electromagnetic wave radiation system according to claim 1, wherein the electromagnetic shielding structure further comprises:

a third dielectric substrate, between the first metal substrate and the electromagnetic wave transmission component, wherein the third dielectric substrate comprises a plurality of second cavities arranged in one-to-one correspondence with the electromagnetic wave transmission structures, and the plurality of first metal pillars are embedded at peripheries of the plurality of second cavities at intervals in the third dielectric substrate.

18. The electromagnetic wave radiation system according to claim 17, wherein the electromagnetic shielding structure further comprises:

a plurality of metal sheets, arranged at intervals on a side of the third dielectric substrate facing the electromagnetic wave transmission component, and in contact with the first metal pillars in one-to-one correspondence.

19. The electromagnetic wave radiation system according to claim 1, wherein at least two rings of the first metal pillars are arranged at a periphery of each of the plurality of shielding units.

20. A communication device, comprising the electromagnetic wave radiation system according to claim 1.

* * * * *